United States Patent
Chen et al.

(10) Patent No.: US 9,762,927 B2
(45) Date of Patent: Sep. 12, 2017

(54) SUB-PREDICTION UNIT (PU) BASED TEMPORAL MOTION VECTOR PREDICTION IN HEVC AND SUB-PU DESIGN IN 3D-HEVC

(71) Applicant: QUALCOMM Incorporated, San Diego, CA (US)

(72) Inventors: Ying Chen, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 14/497,128

(22) Filed: Sep. 25, 2014

(65) Prior Publication Data

US 2015/0085929 A1    Mar. 26, 2015

Related U.S. Application Data

(60) Provisional application No. 61/883,111, filed on Sep. 26, 2013.

(51) Int. Cl.
*H04N 19/53*    (2014.01)
*H04N 19/56*    (2014.01)
(Continued)

(52) U.S. Cl.
CPC ........... *H04N 19/53* (2014.11); *H04N 19/197* (2014.11); *H04N 19/52* (2014.11); *H04N 19/56* (2014.11); *H04N 19/597* (2014.11); *H04N 19/96* (2014.11)

(58) Field of Classification Search
CPC ....... H04N 19/52; H04N 19/53; H04N 19/533
See application file for complete search history.

(56) References Cited

U.S. PATENT DOCUMENTS

2003/0235250 A1    12/2003 Varma et al.
2006/0002474 A1    1/2006 Au et al.
(Continued)

FOREIGN PATENT DOCUMENTS

WO    2013053309 A1    4/2013

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Christopher Findley
(74) *Attorney, Agent, or Firm* — Shumaker & Sieffert, P.A.

(57) ABSTRACT

Techniques are described for sub-prediction unit (PU) based motion prediction for video coding in HEVC and 3D-HEVC. In one example, the techniques include an advanced temporal motion vector prediction (TMVP) mode to predict sub-PUs of a PU in single layer coding for which motion vector refinement may be allowed. The advanced TMVP mode includes determining motion vectors for the PU in at least two stages to derive motion information for the PU that includes different motion vectors and reference indices for each of the sub-PUs of the PU. In another example, the techniques include storing separate motion information derived for each sub-PU of a current PU predicted using a sub-PU backward view synthesis prediction (BVSP) mode even after motion compensation is performed. The additional motion information stored for the current PU may be used to predict subsequent PUs for which the current PU is a neighboring block.

24 Claims, 20 Drawing Sheets

(51) Int. Cl.
H04N 19/196 (2014.01)
H04N 19/597 (2014.01)
H04N 19/52 (2014.01)
H04N 19/96 (2014.01)

(56) References Cited

U.S. PATENT DOCUMENTS

| | | | |
|---|---|---|---|
| 2012/0113326 A1 | 5/2012 | Nagaraja et al. | |
| 2012/0263231 A1* | 10/2012 | Zhou | H04N 19/52 375/240.12 |
| 2013/0070854 A1* | 3/2013 | Wang | H04N 19/436 375/240.16 |
| 2013/0114717 A1* | 5/2013 | Zheng | H04N 19/00642 375/240.14 |
| 2013/0294525 A1 | 11/2013 | Norkin et al. | |
| 2014/0241434 A1 | 8/2014 | Lin et al. | |
| 2014/0286433 A1* | 9/2014 | He | H04N 19/00696 375/240.16 |
| 2015/0030073 A1 | 1/2015 | Chen et al. | |
| 2015/0085935 A1 | 3/2015 | Chen et al. | |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Sullivan, et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012, XP011487803, pp. 1649-1668, ISSN: 1051-8215.
Tian, et al.,"CE1.h: Backward View Synthesis Prediction using Neighbouring Blocks", JCT-3V Meeting; MPEG Meeting; Jan. 16-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-C0152, Jan. 10, 2013, XP030130568, 5 pp.
Kim, et al., "High Efficiency Video Coding (HEVC) Test Model 10 (HM 10) Encoder Description", JCT-VC Meeting, MPEG Meeting, Jan. 14-23, 2013, Geneva, (Joint Collaborative Team on Video Coding of ISO/IEC JTC1/SC29/WG11 and ITU-T SG.16), URL: http://wftp3.itu.int/av-arch/jctvc-site/, No. JCTVC-L1002, Apr. 2, 2013, XP030113947, 37 pp.
Tech, et al., "MV-HEVC Draft Text 5", Joint Collaborative Team on 3D Video Coding Extension Development of ITU-T SG 16 WP 3 and ISO/IEC JTC 1/SC 29/WG 11, Doc: JCT3V-E1004-v6, 5th Meeting: Vienna, AT, Jul. 27-Aug. 2, 2013, 65 pp.
Tech, et al., "3D-HEVC Draft Text 1", JCT-3V Meeting; MPEG Meeting; Jul. 27-Aug. 2, 2013; (The Joint Collaborative Team on 3D Video Coding Extension Development of ISO/IEC JTC1/SC29/WG11 and ITU-T SG.16); No. JCT3V-E1001_v3, XP030130664, 89 pp.
An, et al., "3D-CE3.h related: Sub-PU level inter-view motion prediction", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-E0184, XP030131217, Jul. 19, 2013, 4 pp.
Liu, et al., "CE1: De-blocking friendly sub-PU processing in 3D-HEVC," CT-3V Meeting; Jan. 11-17, 2014; Vienna; (The Joint Collaborative Team on 3D Video Coding Extension Development of ISO/IEC JTC1/SC29/WG11 and ITU-T SG.16 ); Document: JCT3V-G0118, Jan. 3, 2014, 6 pp.
Shimizu, et al., "CE1: Motion parameters stored for VSP-coded blocks" JCT-3V Meeting; Jan. 11-17, 2014; Vienna; (The Joint Collaborative Team on 3D Video Coding Extension Development of ISO/IEC JTC1/SC29/WG11 and ITU-T SG.16 ); Document: JCT3V-G0148, Jan. 3, 2014, 3 pp.
International Search Report and Written Opinion from International Application No. PCT/US2014/057739, dated Nov. 24, 2014, 12 pp.
Response to Written Opinion dated Nov. 24, 2014, from International Application No. PCT/US2014/057739, filed on Jul. 24, 2015, 6 pp.
Second Written Opinion from International Application No. PCT/US2014/057739, dated Sep. 9, 2015, 7 pp.
Second Written Opinion from International Application No. PCT/US2014/057739, dated Dec. 15, 2015, 8 pp.
Response to Second Written Opinion dated Sep. 9, 2015, from International Application No. PCT/US2014/057739, filed on Nov. 9, 2015, 6 pp.
International Preliminary Report on Patentability from International Application No. PCT/US2014/057739, dated Jan. 25, 2016, 10 pp.
U.S Appl. No. 14/906,860, filed by Zhang et al. on Dec. 24, 2013.
Non-Final Office Action from U.S. Appl. No. 14/496,991 dated Apr. 12, 2016 (14 pages).
Response to Non-Final Office Actions from U.S. Appl. No. 14/496,991 dated Apr. 12, 2016 which was filed on Jul. 11, 2016 (18 pages).
Final Office Action from U.S. Appl. No. 14/496,991 dated Aug. 31, 2016 (16 pages).
Applicant-Initiated Interview Summary from U.S. Appl. No. 14/496,991 dated Oct. 20, 2016 (3 pages).
Response to Final Office Action from U.S. Appl. No. 14/496,991 dated Aug. 31, 2016 which was filed on Oct. 27, 2016 (16 pages).
Notice of Allowance from U.S. Appl. No. 14/496,991 dated Nov. 10, 2016 (7 pages).
Notice of Allowance from U.S. Appl. No. 14/496,991 dated Mar. 20, 2017 (10 pages).

* cited by examiner

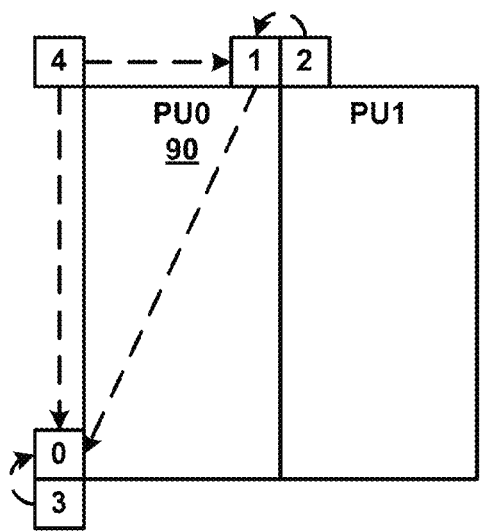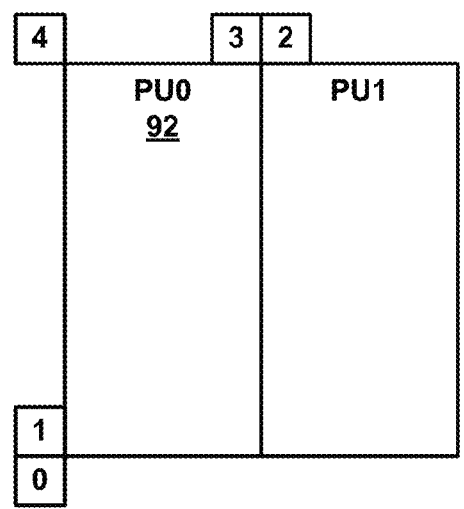
FIG. 4A                    FIG. 4B

|       | 116                                  | 117   |                          |
|-------|--------------------------------------|-------|--------------------------|
|       | ↓            114                     |       |                          |
|       |              ↓                       |       |                          |
| $p3_0$ | $p2_0$ $p1_0$ $p0_0$ \| $q0_0$ $q1_0$ $q2_0$ | $q3_0$ |                       |
| $p3_1$ | $p2_1$ $p1_1$ $p0_1$ \| $q0_1$ $q1_1$ $q2_1$ | $q3_1$ | FIRST SET OF LINES 118 |
| $p3_2$ | $p2_2$ $p1_2$ $p0_2$ \| $q0_2$ $q1_2$ $q2_2$ | $q3_2$ |                       |
| $p3_3$ | $p2_3$ $p1_3$ $p0_3$ \| $q0_3$ $q1_3$ $q2_3$ | $q3_3$ |                       |
| $p3_4$ | $p2_4$ $p1_4$ $p0_4$ \| $q0_4$ $q1_4$ $q2_4$ | $q3_4$ |                       |
| $p3_5$ | $p2_5$ $p1_5$ $p0_5$ \| $q0_5$ $q1_5$ $q2_5$ | $q3_5$ | SECOND SET OF LINES 119 |
| $p3_6$ | $p2_6$ $p1_6$ $p0_6$ \| $q0_6$ $q1_6$ $q2_6$ | $q3_6$ |                       |
| $p3_7$ | $p2_7$ $p1_7$ $p0_7$ \| $q0_7$ $q1_7$ $q2_7$ | $q3_7$ |                       |

FIG. 9

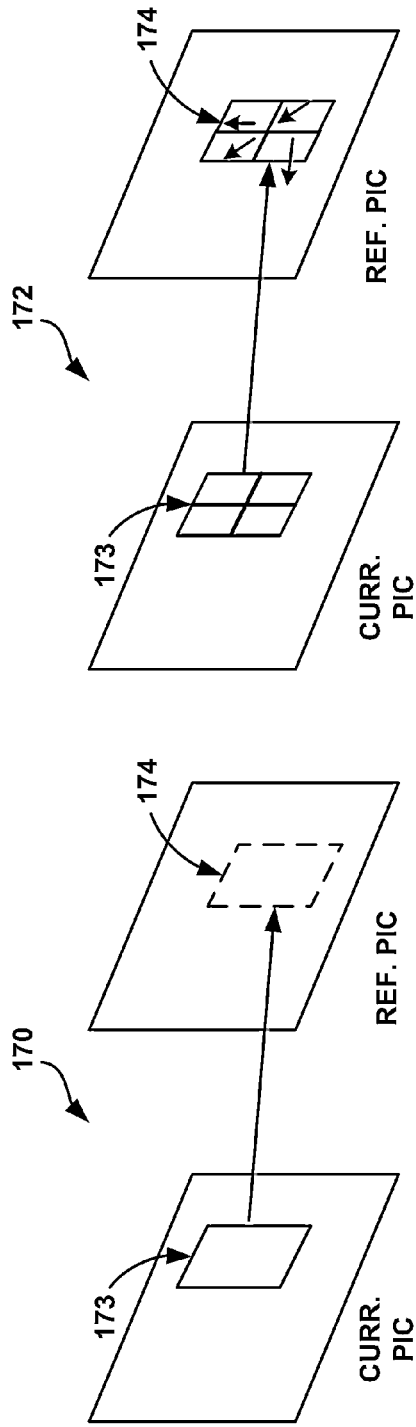
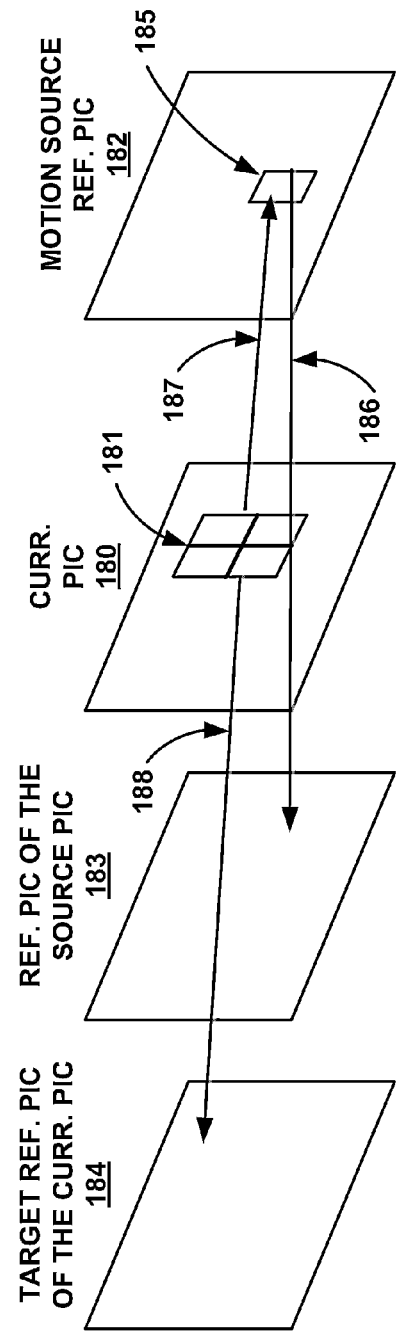
FIG. 14A
FIG. 14B

SUB-PREDICTION UNIT (PU) BASED TEMPORAL MOTION VECTOR PREDICTION IN HEVC AND SUB-PU DESIGN IN 3D-HEVC

This application claims the benefit of U.S. provisional patent application No. 61/883,111, filed Sep. 26, 2013, the entire content of which is incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for sub-prediction unit (PU) based motion prediction for video coding in the High Efficiency Video Coding (HEVC) standard and in the 3D extension to the HEVC standard. In one example, this disclosure describes techniques for performing an advanced temporal motion vector prediction (TMVP) mode to predict sub-PUs of a PU in single layer coding for which motion vector refinement may be allowed. Conventionally, the sub-PU design is only enabled for inter-layer or inter-view motion prediction using a merge inter prediction mode that does not allow further refinement of predicted motion vectors. The advanced TMVP mode includes determining motion vectors for the PU in at least two stages to derive motion information for the PU that includes different motion vectors and reference indices for each of the sub-PUs of the PU.

The 3D-HEVC extension supports the coding of multiview video plus depth format. In one example, in a sub-PU backward view synthesis prediction (BVSP) mode, motion information for a current PU is predicted from a disparity motion vector and an associated inter-view reference picture, and the disparity motion vector is refined based on sub-PU motion information associated with depth blocks of the inter-view reference picture. In the sub-PU BVSP mode, motion compensation is performed to predict each of the sub-PUs of the PU based on the separate sub-PU motion information. Conventionally, after performing motion compensation to predict each of the sub-PUs, only the disparity motion vector is stored for the current PU. According to the techniques of this disclosure, for each PU predicted using the sub-PU BVSP mode, a video coding device stores the separate motion information derived for each of the sub-PUs of the current PU even after motion compensation is performed. The additional motion information stored for the current PU may then be used to predict subsequent PUs for which the current PU is a neighboring block.

In addition, this disclosure describe techniques for applying a deblocking filter to each coding unit (CU) of a video block to filter transform unit (TU) boundaries and PU boundaries including sub-PU boundaries within the CU by creating artificial PU boundaries or artificial TU boundaries at the sub-PU boundaries.

In one example, this disclosure is directed to a method of processing video data comprising determining a first stage motion vector for a PU of a CU of a video block from neighboring blocks of the PU as a first stage of an advanced TMVP mode, wherein the first stage motion vector identifies a block of a reference picture corresponding to the PU; partitioning the PU into two or more sub-PUs; determining second stage motion information for each of the sub-PUs from the block of the reference picture identified by the first stage motion vector as a second stage of the advanced TMVP mode, wherein the second stage motion information for each of the sub-PUs includes at least one motion vector and an associated reference index; and performing motion compensation for each of the sub-PUs separately based on the second stage motion information for each of the sub-PUs.

In another example, this disclosure is directed to a video processing device comprising a memory configured to store video data; and one or more processors in communication with the memory. The one or more processors are configured to determine a first stage motion vector for a PU of a CU of a video block from neighboring blocks of the PU as a first stage of an advanced TMVP mode, wherein the first stage motion vector identifies a block of a reference picture corresponding to the PU, partition the PU into two or more sub-PUs, determine second stage motion information for each of the sub-PUs from the block of the reference picture identified by the first stage motion vector as a second stage of the advanced TMVP mode, wherein the second stage motion information for each of the sub-PUs includes at least one motion vector and an associated reference index, and perform motion compensation for each of the sub-PUs separately based on the second stage motion information for each of the sub-PUs.

In a further example, this disclosure is directed to a video processing device comprising means for determining a first stage motion vector for a PU of a CU of a video block from neighboring blocks of the PU as a first stage of an advanced TMVP mode, wherein the first stage motion vector identifies a block of a reference picture corresponding to the PU; means for partitioning the PU into two or more sub-PUs; means for determining second stage motion information for each of the sub-PUs from the block of the reference picture identified by the first stage motion vector as a second stage of the advanced TMVP mode, wherein the second stage motion information for each of the sub-PUs includes at least one motion vector and an associated reference index; and means for performing motion compensation for each of the sub-PUs separately based on the second stage motion information for each of the sub-PUs.

In an additional example, this disclosure is directed to a computer-readable storage medium storing instructions for processing video data that, when executed, cause one or more processors to determine a first stage motion vector for a PU of a CU of a video block from neighboring blocks of the PU as a first stage of an advanced TMVP mode, wherein the first stage motion vector identifies a block of a reference picture corresponding to the PU; partition the PU into two or more sub-PUs; determine second stage motion information for each of the sub-PUs from the block of the reference picture identified by the first stage motion vector as a second stage of the advanced TMVP mode, wherein the second stage motion information for each of the sub-PUs includes at least one motion vector and an associated reference index; and perform motion compensation for each of the sub-PUs separately based on the second stage motion information for each of the sub-PUs.

In another example, this disclosure is directed to a method of processing video data, the method comprising determining first motion information for a PU of a CU of a video block from neighboring blocks of the PU according to a BVSP mode, wherein the first motion information includes at least one disparity motion vector and an associated reference view index that identifies an inter-view reference picture; partitioning the PU into two or more sub-PUs; determining second motion information for each of the sub-PUs, wherein the second motion information includes at least one disparity motion vector associated with a depth block of the inter-view reference picture corresponding to each of the sub-PUs; performing motion compensation to predict each of the sub-PUs from the inter-view reference picture based on the second motion information; and storing the second motion information for each of the sub-PUs of the PU in a memory to be used for predicting subsequent PUs.

In a further example, this disclosure is directed to a video processing device comprising a memory configured to store video data, and one or more processors in communication with the memory. The one or more processors are configured to determine first motion information for a PU of a CU of a video block from neighboring blocks of the PU according to a BVSP mode, wherein the first motion information includes at least one disparity motion vector and an associated reference view index that identifies an inter-view reference picture, partition the PU into two or more sub-PUs, determine second motion information for each of the sub-PUs, wherein the second motion information includes at least one disparity motion vector associated with a depth block of the inter-view reference picture corresponding to each of the sub-PUs, and perform motion compensation to predict each of the sub-PUs from the inter-view reference picture based on the second motion information. The memory is configured to store the second motion information for each of the sub-PUs of the PU to be used for predicting subsequent PUs.

In an additional example, this disclosure is directed to video processing device comprising means for determining first motion information for a PU of a CU of a video block from neighboring blocks of the PU according to a BVSP mode, wherein the first motion information includes at least one disparity motion vector and an associated reference view index that identifies an inter-view reference picture; means for partitioning the PU into two or more sub-PUs; means for determining second motion information for each of the sub-PUs, wherein the second motion information includes at least one disparity motion vector associated with a depth block of the inter-view reference picture corresponding to each of the sub-PUs; means for performing motion compensation to predict each of the sub-PUs from the inter-view reference picture based on the second motion information; and means for storing the second motion information for each of the sub-PUs of the PU in a memory to be used for predicting subsequent PUs.

In another example, this disclosure is directed to computer-readable storage medium storing instructions for processing video data that, when executed, cause one or more processors to determine first motion information for a PU of a CU of a video block from neighboring blocks of the PU according to a BVSP mode, wherein the first motion information includes at least one disparity motion vector and an associated reference view index that identifies an inter-view reference picture; partition the PU into two or more sub-PUs; determine second motion information for each of the sub-PUs, wherein the second motion information includes at least one disparity motion vector associated with a depth block of the inter-view reference picture corresponding to each of the sub-PUs; perform motion compensation to predict each of the sub-PUs from the inter-view reference picture based on the second motion information; and store the second motion information for each of the sub-PUs of the PU in a memory to be used for predicting subsequent PUs.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A and 4B are conceptual diagrams illustrating spatial neighboring candidates for merge mode and advanced motion vector prediction (AMVP) mode, respectively.

FIG. 9 is a conceptual diagram illustrating pixels involved in an on/off filter decision and a strong/weak filter selection for a deblocking filter process.

FIGS. 14A and 14B are conceptual diagrams illustrating an advanced TMVP mode to predict sub-PUs in a PU in single layer coding.

DETAILED DESCRIPTION

Figure 1:
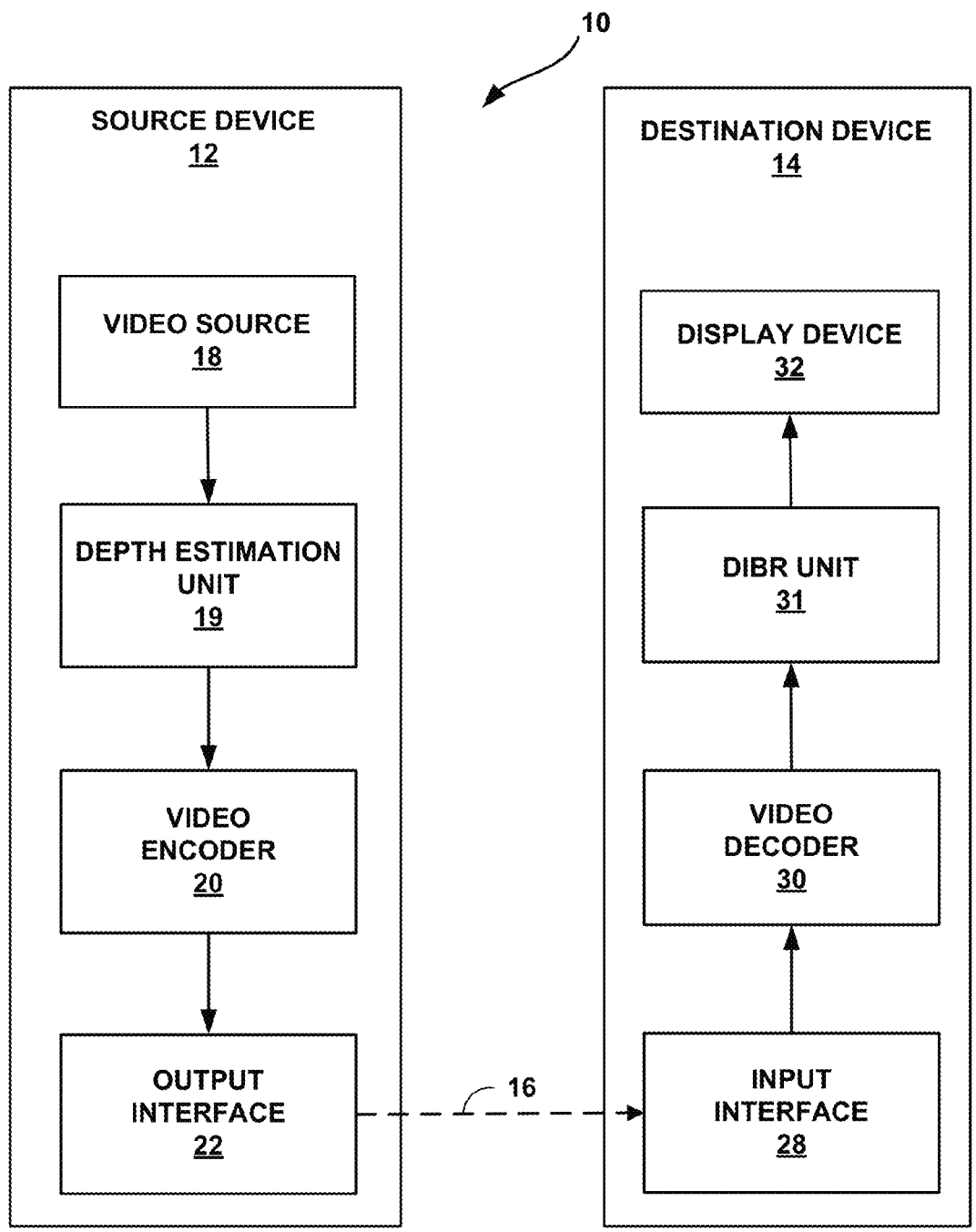
FIG. 1 is a block diagram illustrating an example video encoding and decoding system that may utilize the techniques of this disclosure.

This disclosure describes techniques for sub-prediction unit (PU) level motion prediction for video coding using the 3D extension to the High Efficiency Video Coding (HEVC) standard. The 3D-HEVC extension supports the coding of multiview video plus depth format. In multiview video coding, a current video picture may be predicted by both temporal reference pictures in a same view and inter-view reference pictures in a reference view.

In one example, view synthesis prediction in 3D-HEVC may be performed using a sub-PU backward view synthesis prediction (BVSP) mode. In the sub-PU BVSP mode, motion information for a current PU is predicted from a disparity motion vector and an associated reference view index that identifies an inter-view reference picture. In the sub-PU BVSP mode, the current PU is partitioned into two or more sub-PUs, and the disparity motion vector is refined based on sub-PU motion information derived for each of the sub-PUs based on a corresponding depth block of the inter-view reference picture. Motion compensation is performed to predict each of the sub-PUs of the PU based on the separate sub-PU motion information. Conventionally, after performing motion compensation to predict each of the sub-PUs, only the disparity motion vector is stored for the current PU.

According to the techniques of this disclosure, for each PU predicted using the sub-PU BVSP mode, a video coding device stores the separate motion information derived for each of the sub-PUs of the current PU even after motion compensation is performed. The additional motion information stored for the current PU may then be used to predict subsequent PUs for which the current PU is a neighboring block.

As another example, this disclosure describes techniques for performing an advanced temporal motion vector prediction (TMVP) mode to predict sub-PUs of a PU in single layer coding for which motion vector refinement may be allowed. Conventionally, the sub-PU design is only enabled for inter-layer or inter-view motion prediction using a merge inter prediction mode that does not allow further refinement of predicted motion vectors. The advanced TMVP mode includes determining motion vectors for the PU in at least two stages to derive motion information for the PU that includes different motion vectors and reference indices for each of the sub-PUs of the PU. A sub-PU within a PU can be of size N×N or N×M, wherein N and M can be any integer numbers. Typical sub-PU sizes can be 4×4, 8×8, 4×8 or 8×4.

According to the techniques of this disclosure, a first stage motion vector is determined for a current PU from neighboring blocks of the PU, where the first stage motion vector identifies a block of a reference picture corresponding to the current PU. Similar to sub-PU motion prediction in 3D-HEVC, the size of the corresponding area (e.g., block) of the reference picture that includes the smaller sub-PUs is the same as the size of the current PU. In this way, the sub-PUs of the current PU have corresponding sub-PUs in the corresponding area of the reference picture identified with a unique motion vector. The first stage motion vector may be identified based on spatial and/or temporal neighbors. Alternatively, the first stage motion vector may be set to be constant. e.g., 0 or another pre-defined value, and is related to the size of the current PU. In another alternative, each of the sub-PUs of the PU may identify its corresponding block of the reference picture with a different motion vector.

As described above, the current PU is partitioned into two or more sub-PUs, and second stage motion information is determined for each of the sub-PUs from the corresponding area. e.g., block, of the reference picture identified by the first stage motion vector, where the second stage motion information for each of the sub-PUs includes at least one motion vector and an associated reference index. Motion compensation is performed to predict each of the sub-PUs separately based on the second stage motion information for each of the sub-PUs. This advanced TMVP process may be achieved as activating a merge candidate among all the other merge candidates, meaning a specific merge candidate is created to indicate such a process needs to be done for the current PU. In some examples, instead of operating purely in the merge mode, a motion vector difference may be determined to refine the at least one motion vector of the second stage motion information for each of the sub-PUs.

As a further example, this disclosure describes techniques related to deblocking filter processes applied to coding units (CUs) of a video block that include at least one PU with multiple sub-PUs. Deblocking filters for the HEVC standard are not designed to filter within a PU, i.e., along sub-PU boundaries between adjacent sub-PUs of the PU, because for HEVC blocks it is assumed that motion compensation is the same for the entire PU. The techniques of this disclosure enable sub-PU boundaries to be deblocked by converting the sub-PUs to a deblocking friendly structure so that HEVC deblocking filters may continue to be used for 3D-HEVC blocks. The proposed deblocking techniques may be applicable to multi-layer codecs, including 3D-HEVC.

According to the techniques of this disclosure, prior to applying a deblocking filter to a CU of the video block that includes the PU with the sub-PUs, the CU is converted in order to create artificial PU boundaries or artificial TU boundaries at the sub-PU boundaries. In one example, a transform tree of the CU is converted in order to associate the PU with a transform tree hierarchy and associate each of the sub-PUs with a TU such that the sub-PU boundaries are converted to artificial TU boundaries. In another example, the CU is converted to a coding tree in order to associate the PU with a CU and associate each of the sub-PUs with a PU such that the sub-PU boundaries are converted to artificial PU boundaries. The deblocking filter may then be applied to the PU boundaries between two adjacent PUs of the CU and/or the TU boundaries between two adjacent TUs of the CU, including the artificial PU boundaries and the artificial TU boundaries.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in ITU-T H.264, Series H: Audiovisual and Multimedia Systems, Infrastructure of audiovisual services—Coding of moving video, Advanced video coding for generic audiovisual services, Telecommunication Standardization Sector of International Telecommunication Union (ITU), March 2010.

In addition, the design of a new video coding standard, namely High Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). A HEVC draft specification, referred to as "HEVC Working Draft 10" or "WD10," described in Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, JCTVC-L1003v34, is available from http://phenix.int-evry.fr/jct/doc_end_user/documents/12_Geneva/wg11/JCTVC-L1003-v34.zip.

The finalized standard document is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2013. A recent encoder description of HEVC, described in Il-Koo Kim et al., "High Efficiency Video Coding (HEVC) Test Model 10 (HM10) Encoder Description, Joint Collaborative Team on Video Coding (JCT-VC) of ITU-T SG16 WP3 and ISO/IEC JTC1/SC29/WG11, 12th Meeting: Geneva, CH, 14-23 Jan. 2013, is available from: http://phenix.int-evry.fr/jct/doc_end_user/documents/12_Geneva/wg11/JCTVC-L1002-v3.zip.

Two extensions of HEVC supporting 3D services have been under development by the Joint Collaboration Team on 3D Video coding (JCT-3V) of ITU-T Video Coding Experts Group (VCEG) and ISO/IEC Motion Picture Experts Group (MPEG). The two extensions are the multiview extension to HEVC (MV-HEVC) and the 3D extension to HEVC (3D-HEVC).

MV-HEVC supports the coding of multiple texture views without changing the block level design of HEVC. A draft specification of MV-HEVC, referred to as MV-HEVC Working Draft 5 (WD5) and described in Tech et al., "MV-HEVC Draft Text 5," Joint Collaborative Team on 3D Video Coding Extension Development (JCT-3V) of ITU-T SG16 WP3 and ISO/IEC JTC1/SC29/WG11, 5th Meeting: Vienna, AT, 27 Jul.-2 Aug. 2013, JCT3V-E1004v6, is available from http://phenix.it-sudparis.eu/jct2/doc_end_user/documents/5_Vienna/wg11/JCT3V-E1004-v6.zip.

3D-HEVC supports the coding of multiview video plus depth format and includes new coding tools built in addition to the HEVC coding modules. The newly introduced coding tools are applicable for both texture coding and depth coding. A draft specification of 3D-HEVC, referred to as 3D-HEVC Working Draft 1 (WD1) and described in Tech et al., "3D-HEVC Draft Text 1." Joint Collaborative Team on 3D Video Coding Extension Development (JCT-3V) of ITU-T SG 16 WP 3 and ISO/IEC JTC 1/SC 29/WG 11, 5th Meeting: Vienna, AT, 27 Jul.-2 Aug. 2013, JCT3V-E1001v3, is available from http://phenix.it-sudparis.eu/jet2/doc_end_user/documents/5_Vienna/wg11/JCT3V-E1001-v3.zip.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, depth estimation unit 19, video encoder 20, and output interface 22. Destination device 14 includes input interface 28, video decoder 30, depth image based rendering (DIBR) unit 31, and display device 32. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. The techniques of this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Video source 18 may provide multiple views of video data to video encoder 20. For example, video source 18 may correspond to an array of cameras, each having a unique horizontal position relative to a particular scene being filmed. Alternatively, video source 18 may generate video data from disparate horizontal camera perspectives, e.g., using computer graphics. Depth estimation unit 19 may be configured to determine values for depth pixels corresponding to pixels in a texture image. For example, depth estimation unit 19 may represent a Sound Navigation and Ranging (SONAR) unit, a Light Detection and Ranging (LIDAR) unit, or other unit capable of directly determining depth values substantially simultaneously while recording video data of a scene.

Additionally or alternatively, depth estimation unit 19 may be configured to calculate depth values indirectly by comparing two or more images that were captured at substantially the same time from different horizontal camera perspectives. By calculating horizontal disparity between substantially similar pixel values in the images, depth estimation unit 19 may approximate depth of various objects in the scene. Depth estimation unit 19 may be functionally integrated with video source 18, in some examples. For example, when video source 18 generates computer graphics images, depth estimation unit 19 may provide actual depth maps for graphical objects, e.g., using z-coordinates of pixels and objects used to render texture images.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device. In some examples, display device 32 may comprise a device capable of displaying two or more views simultaneously or substantially simultaneously, e.g., to produce a 3D visual effect for a viewer.

DIBR unit 31 of destination device 14 may render synthesized views using texture and depth information of decoded views received from video decoder 30. For example, DIBR unit 31 may determine horizontal disparity for pixel data of texture images as a function of values of pixels in corresponding depth maps. DIBR unit 31 may then generate a synthesized image by offsetting pixels in a texture image left or right by the determined horizontal disparity. In this manner, display device 32 may display one or more views, which may correspond to decoded views and/or synthesized views, in any combination. Video decoder 30 may provide precision values for depth ranges and camera parameters to DIBR unit 31, which may use the depth ranges and camera parameters to properly synthesize views.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10. Advanced Video Coding (AVC), or extensions of such standards, such as the MVC extension of ITU-T H.264/AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Initially, example coding techniques of HEVC will be discussed. The HEVC WD10, referenced above, presumes several additional capabilities of video coding devices relative to existing devices according to, e.g., ITU-T H.264/AVC. For example, whereas H.264 provides nine intra-prediction encoding modes, the HEVC WD10 may provide as many as thirty-three angular intra-prediction encoding modes plus DC and Planar modes.

In HEVC WD10 and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

The HEVC WD10 describes that a video frame or picture may be divided into a sequence of coding tree units (CTUs) or largest coding units (LCU) that include both luma and chroma samples. A CTU has a similar purpose as a macroblock of the H.264 standard. A slice includes a number of consecutive CTUs in coding order. A video frame or picture may be partitioned into one or more slices. Each CTU may be split into coding units (CUs) according to a quadtree. For example, a CTU, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a CTU may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC WD10 allows for transformations according to TUs, which may be different for different CUs. The TUs are typically sized based on the size of PUs within a given CU defined for a partitioned CTU or LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a CTU, also referred to as a LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HEVC WD10 supports prediction in various PU sizes. Assuming that the size of a particular CU is 2N×2N, the HEVC WD10 supports intra-prediction in PU sizes of 2N×2N or N×N, and inter-prediction in symmetric PU sizes of 2N×2N, 2N×N, N×2N, or N×N. The HEVC WD10 also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the predictive samples of the predictive blocks for PUs of the current CU to corresponding residual samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

In MV-HEVC and 3D-HEVC, video encoder 20 may generate a multi-layer bitstream that comprises a series of network abstraction layer (NAL) units. Different NAL units of the bitstream may be associated with different layers of the bitstream. A layer may be defined as a set of video coding layer (VCL) NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In 3D-HEVC, a layer may contain either all coded depth pictures of a specific view or coded texture pictures of a specific view. Similarly, in the context of scalable video coding, a layer typically corresponds to coded pictures having video characteristics different from coded pictures in other layers. Such video characteristics typically include spatial resolution and quality level (Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. NAL units only encapsulate data of a single layer. A view may be referred to as a "base layer" if video decoder 30 can decode pictures in the view without reference to data of any other layer. The base layer may conform to the HEVC base specification. Thus, NAL units encapsulating data of the highest remaining layer of the bitstream may be removed from the bitstream without affecting the decodability of data in the remaining layers of the bitstream. In MV-HEVC and 3D-HEVC, higher layers may include additional view components.

Some general features of video coding will now be discussed more detail. Initially, motion information will be discussed. For each block, a set of motion information may be available. A set of motion information includes motion information for forward and backward prediction directions.

Here, forward and backward prediction directions are two prediction directions of a bi-directional prediction mode and the terms "forward" and "backward" do not necessarily have a geometry meaning; instead, they correspond to reference picture list 0 (RefPicList0) and reference picture list 1 (RefPicList1) of a current picture. When only one reference picture list is available for a picture or slice, only RefPicList0 may be available and the motion information of each block of a slice is always forward.

For each prediction direction, the motion information includes a reference index and a motion vector. In some cases, for simplicity, a motion vector itself may be referred to in a way that it is assumed that it has an associated reference index. A reference index is used to identify a reference picture in the current reference picture list (RefPicList0 or RefPicList1). A motion vector has a horizontal and a vertical component.

Picture order count (POC) is widely used in video coding standards to identify a display order of a picture. Although there are cases where two pictures within one coded video sequence may have the same POC value, it typically does not happen within a coded video sequence. When multiple coded video sequences are present in a bitstream, pictures with a same value of POC may be closer to each other in terms of decoding order. POC values of pictures are typically used for reference picture list construction, derivation of a reference picture set as in HEVC, and motion vector scaling.

Some specific techniques in H.264/AVC will now be discussed. Initially, the macroblock structure in AVC will be discussed. In H.264/AVC, each inter macroblock (MB) may be partitioned in four different ways: one 16×16 MB partition, two 16×8 MB partitions, two 8×16 MB partitions, or four 8×8 MB partitions. Different MB partitions in one MB may have different reference index values for each direction (RefPicList0 or RefPicList1). When an MB is not partitioned into four 8×8 MB partitions, it has only one motion vector for each MB partition in each direction. When an MB is partitioned into four 8×8 MB partitions, each 8×8 MB partition can be further partitioned into sub-blocks, each of which can have a different motion vector in each direction.

There are four different ways to get sub-blocks from an 8×8 MB partition: one 8×8 sub-block, two 8×4 sub-blocks, two 4×8 sub-blocks, or four 4×4 sub-blocks. Each sub-block can have a different motion vector in each direction. Motion vectors, therefore, are present at a level equal to or higher than the sub-block level.

The temporal direct mode in AVC will now be discussed. In AVC, temporal direct mode may be enabled at either the MB level or the MB partition level for skip or direct modes in B slices. For each MB partition, the motion vectors of the block co-located with the current MB partition in the RefPicList1[0] of the current block are used to derive the motion vectors. Each motion vector in the co-located block is scaled based on POC distances.

Some specific techniques in HEVC will now be discussed. In HEVC, the largest coding unit (CU) in a slice is called a coding tree block (CTB). A CTB includes a quad-tree, and the nodes of the quad-tree are CUs. The size of a CTB can range from 16×16 to 64×64 in the HEVC main profile, although technically 8×8 CTB sizes may be supported. The size of a CU may range from as large as the same size as the CTB to as small as 8×8. Each CU is coded with one mode. When a CU is inter coded, the CU may be further partitioned into two or four prediction units (PUs) or become just one PU when further partitioning does not apply. When the CU is inter coded, one set of motion information is present for each PU of the CU. In addition, each PU of the CU is coded with a unique inter-prediction mode to derive the associated set of motion information.

Figure 2:
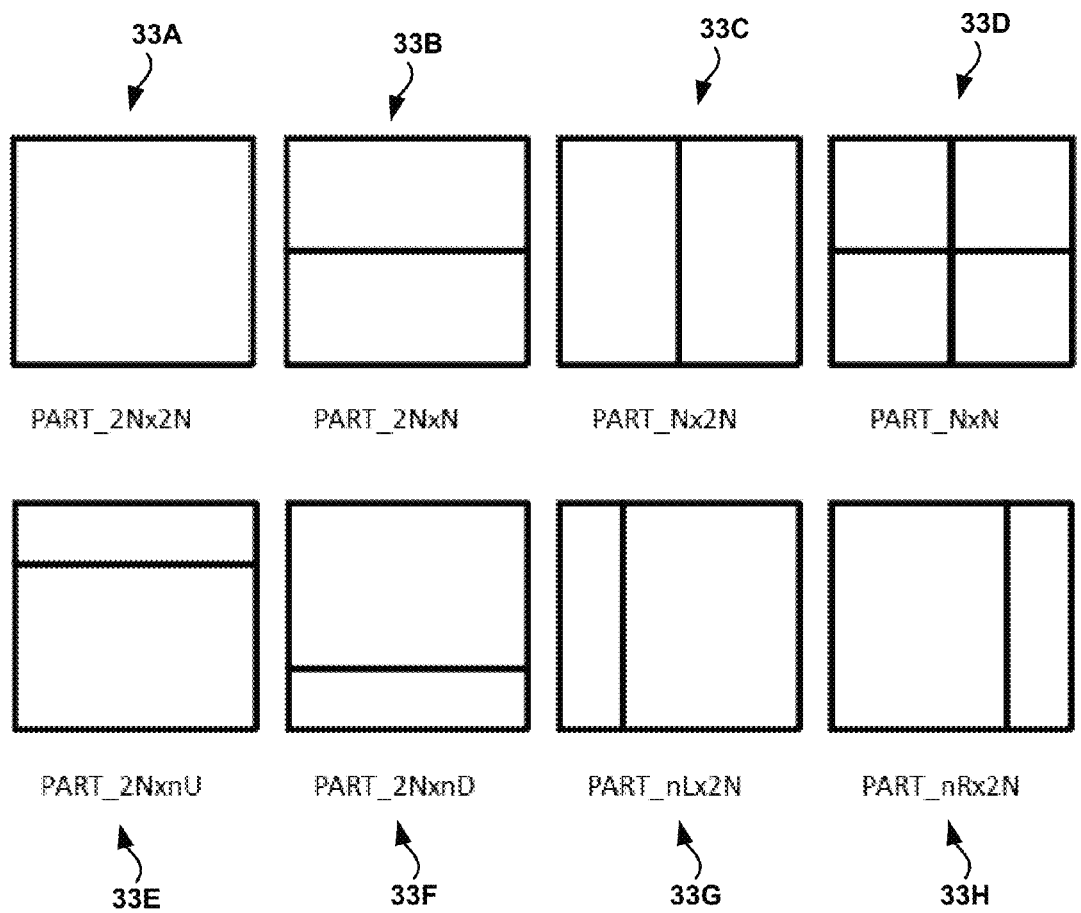
FIG. 2 is a conceptual diagram illustrating eight partition modes for defining prediction units (PUs) of a coding unit (CU).

FIG. 2 is a conceptual diagram illustrating eight partition modes 33A-33H ("partition modes 33") for defining PUs of a CU. A PU is a region on which prediction is applied that is defined by partitioning the CU. As shown in FIG. 2, a PU is not restricted to being square in shape, in order to facilitate partitioning of the CU to match the boundaries of real objects in the picture. Each CU includes one, two, or four PUs depending on the partition mode. In some examples, when two PUs are present in one CU, the PUs may be half-size rectangles, as in the PART_2N×N 33B and PART_N×2N 33C partition modes. In other examples, when two PUs are present in one CU, the PUs may be two rectangles with sizes of one-quarter or three-quarters the size of the CU, as in the PART_2N×nU 33E, PART_2N×nD 33F, PART_nL×2N 33G, and PART_nR×2N 33H partition modes. The PART_2N×2N 33A and PART_N×N 33D partition modes are used for an intra-coded CU. The PART_N×N 33D partition mode is allowed only when the corresponding CU size is equal to the minimum CU size.

Figure 3:
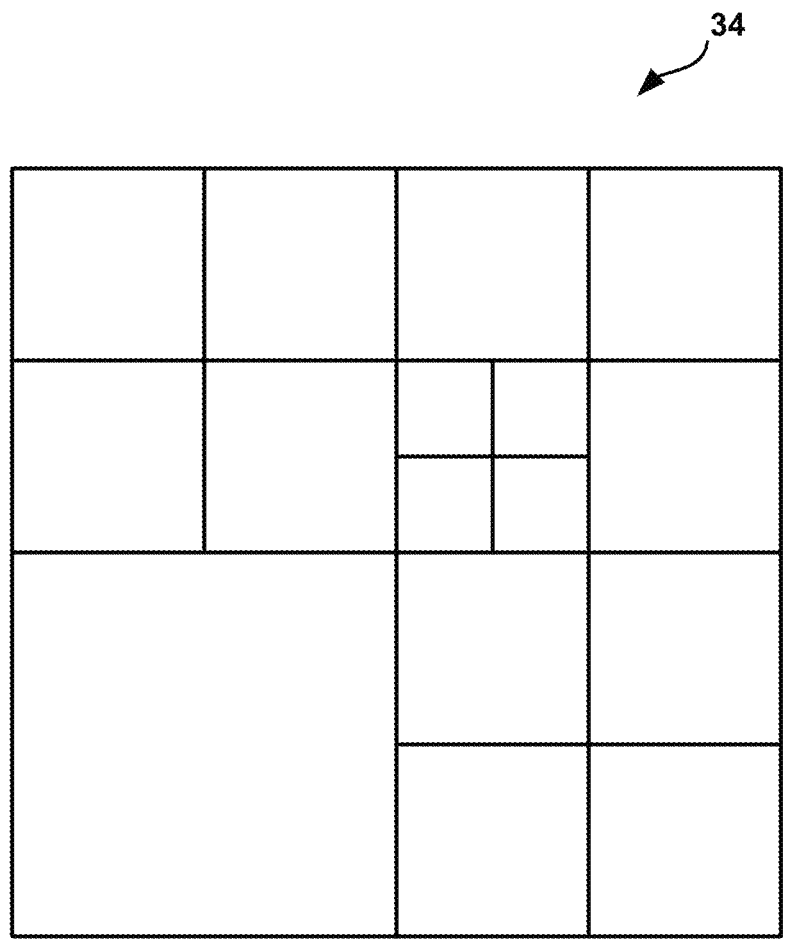
FIG. 3 is a conceptual diagram illustrating a transform tree structure within a CU.

FIG. 3 is a conceptual diagram illustrating a transform tree structure 34 within a CU. Each CU corresponds to one transform tree, which is a quad-tree, the leaf of which is a transform unit (TU). Each of the TUs in transform tree structure 34 is a square region on which transform and quantization processes are applied that is defined by quad-tree partitioning of the CU. As shown in FIG. 3, a TU is always square in shape. A TU may be as large as 32×32 samples down to 4×4 samples. A maximum quad-tree depth, i.e., how far the transform tree structure 34 may be split to form leaf nodes, is adjustable and specified in the slice header syntax. For an inter CU, a TU can be larger than a PU. i.e., the TU may contain PU boundaries. For an intra CU, however, a TU cannot cross PU boundaries.

A syntax element rqt_root_cbf equal to 1 specifies that a transform_tree syntax structure is present for a current CU. The syntax element rqt_root_cbf equal to 0 specifies that the transform_tree syntax structure is not present for the current CU.

When the syntax element rqt_root_cbf is not present, its value is inferred to be equal to 1. When the syntax element rqt_root_cbf is equal to 0, the transform tree only contains one node, meaning it is not further split and a split_transform_flag is equal to 0. For a node inside the transform tree, if it has a split_transform_flag equal to 1, it is further split into four nodes, and a leaf of the transform tree has a split_transform_flag equal to 0.

For simplicity, if a TU or transform tree corresponds to a block which does not have a transform, it is still considered to be a TU or transform unit because the hierarchy of the transform itself still exists even though the transform is not applied. Typically, a transform skipped block corresponds to a transform unit.

A coded block flag (cbf) of a TU equal to 1 specifies that the TU contains one or more non-zero transform coefficient levels, i.e., not equal to 0. A CBF of a TU equal to 0 specifies that all transform coefficient levels of the TU are equal to 0. A CBF is set for each component of the TU, i.e., a CBF is set for each of luminance (Y) and chrominance (Cb and Cr) components.

In the HEVC standard, there are two inter prediction modes, named merge and advanced motion vector prediction (AMVP) modes, for predicting motion for a current prediction unit (PU). A skip mode is considered a special case of the merge mode. In either the AMVP or merge mode, a motion vector (MV) candidate list is maintained that includes multiple motion vector predictors. The motion vectors, as well as associated reference indices in the merge mode, are generated for the current PU by selecting one of the candidates from the MV candidate list.

In the merge mode, the MV candidate list includes up to five candidates. A merge candidate may contain a set of motion information, e.g., motion vectors corresponding to both reference picture lists (list 0 and list 1) and the associated reference indices. If a merge candidate is identified by a merge index for the current PU, the motion vectors and associated reference pictures are used for the prediction of the current PU.

In the AMVP mode, the MV candidate list includes only two candidates. An AMVP candidate contains motion vectors corresponding to both reference picture lists (list 0 and list 1). If an AMVP candidate is identified by an AMVP index for the current PU, a reference index needs to be explicitly signaled for each potential prediction direction from either list 0 or list 1 together with the AMVP index since the AMVP candidate includes only a motion vector. In the AMVP mode, the predicted motion vectors may be further refined by signaling a motion vector difference and performing motion vector scaling.

As described above, a merge candidate includes to a full set of motion information while an AMVP candidate includes just one motion vector for a specific prediction direction and explicitly signaled reference index. The candidates for both modes are derived similarly from the same spatial and temporal neighboring blocks of the current PU.

FIGS. 4A and 4B are conceptual diagrams illustrating spatial neighboring candidates for the merge mode and the AMVP mode, respectively. Spatial MV candidates are derived from the neighboring blocks shown in FIGS. 4A and 4B, for a current PU (PU0), although the methods for generating the candidates from the blocks differ for the merge and AMVP modes.

In the merge mode, up to four spatial MV candidates may be derived from the neighboring blocks of PU0 90 in the numbered order shown in FIG. 4A. In the illustrated example of FIG. 4A, the order is as follows: left block (0), above block (1), above right block (2), below left block (3), and above left block (4).

In the AMVP mode, up to two spatial MV candidates may be derived from the neighboring blocks of PU0 92 in the numbered order shown in FIG. 4B. The neighboring blocks of PU0 92 are divided into two groups: a left group including the below left block (0) and the left block (1), and an above group including the above right block (2), the above block (3), and the above left block (4), as shown on FIG. 4B. For each group, a motion vector for a neighboring block that refers to the same reference picture as the explicitly signaled reference index for PU0 92 has the highest priority of being chosen to form a final MV candidate of the group. In some examples, it is possible that none of the neighboring blocks have a motion vector that points to the explicitly signaled reference picture. If such a MV candidate cannot be found, the first available motion vector will be scaled to form the final MV candidate of the group. In this case, any temporal distance differences will be compensated.

Figure 5A:
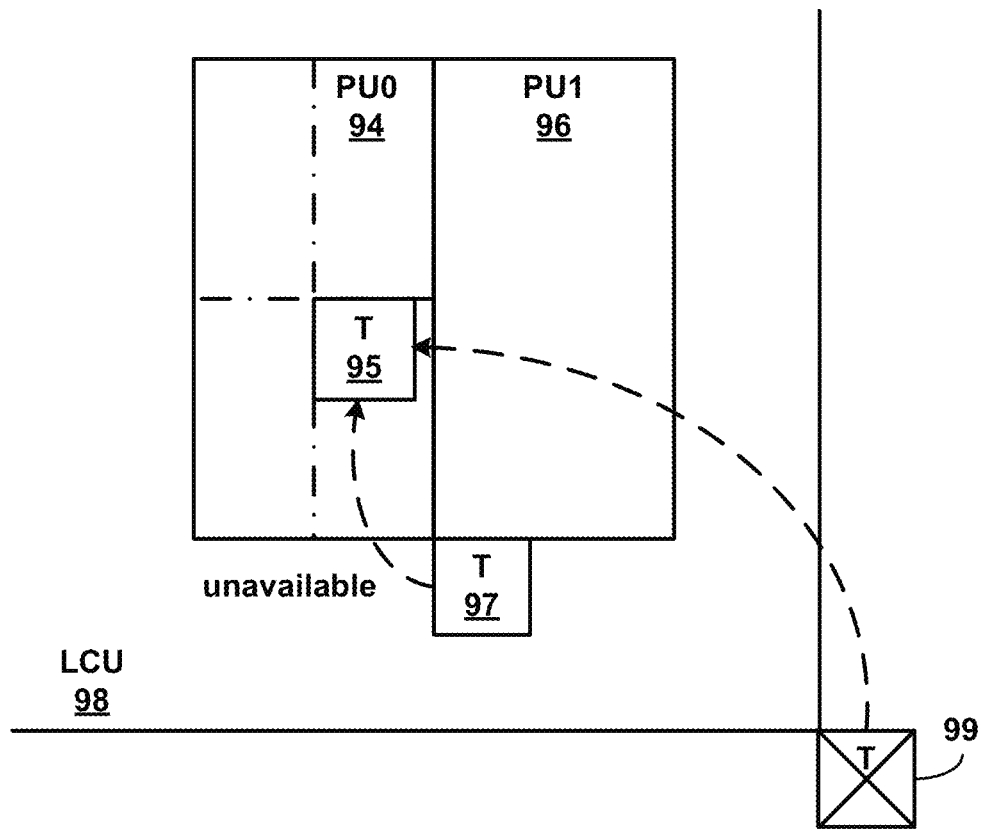
FIG. 5A is a conceptual diagram illustrating temporal motion vector prediction (TMVP) candidates.

FIG. 5A is a conceptual diagram illustrating temporal motion vector prediction (TMVP) candidates for a current PU (PU0) 94. A TMVP candidate, if enabled and available, is added into the MV candidate list after the spatial MV candidates. The process of motion vector derivation for a TMVP candidate is the same for both the merge mode and the AMVP modes. In the merge mode, however, the target reference index for the TMVP candidate is always set to 0.

The primary block location for TMVP candidate derivation is the bottom right block outside of a co-located PU (PU1) 96 of PU0 94, as shown in FIG. 5A as block T 97. Bottom right block T 97 is selected to compensate the bias to the above and left blocks used to generate the spatial neighboring candidates. If, however, the bottom right block T is located outside of the current LCU 98 of PU0 94 (i.e., in position 99) or the motion information for the bottom right block T 97 is not available, the block used for TMVP candidate derivation is substituted with a center block T 95 of PU0 94.

Figure 5B:
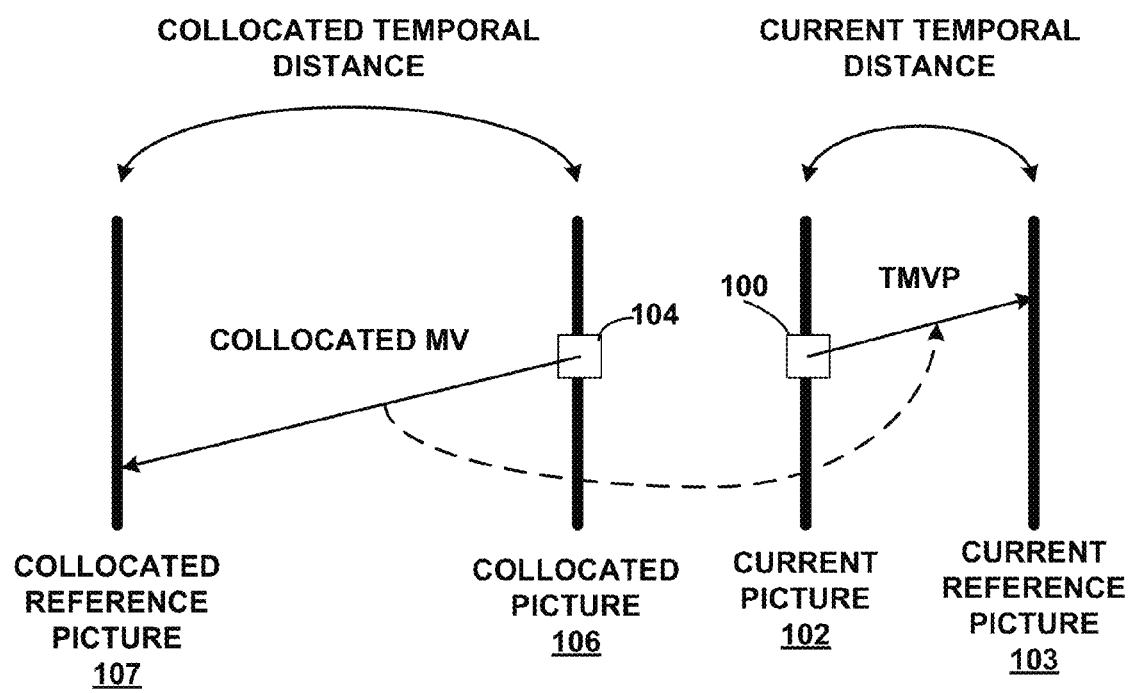
FIG. 5B is a conceptual diagram illustrating motion vector (MV) scaling for TMVP.

FIG. 5B is a conceptual diagram illustrating MV scaling for the TMVP mode for a current PU 100 in current picture 102. A motion vector for a TMVP candidate is derived from a co-located PU 104 of co-located picture 106, indicated in the slice level. Similar to temporal direct mode in AVC, described above, a motion vector of the TMVP candidate may be generated for current PU 100 using scaling, which is performed to compensate the differences between the co-located temporal distance (i.e., the distance between co-located picture 106 and co-located reference picture 107) and the current temporal difference (i.e., between current picture 102 and current reference picture 103), as shown in FIG. 5B.

Other aspects of motion vector prediction in HEVC will now be discussed. In motion vector scaling, it is assumed that the value of motion vectors is proportional to the distance of pictures in the presentation time. A motion vector associates two pictures: the reference picture and the picture containing the motion vector (namely the containing picture). When a motion vector is utilized to predict another motion vector, the distance of the containing picture and the reference picture is calculated based on the Picture Order Count (POC) values of the pictures. For a motion vector to be predicted, both its containing picture and associated reference picture may be different. In this case, a new distance (based on POC) is calculated. The motion vector is scaled based on these two POC distances. For a spatial neighboring candidate, the containing pictures for the two motion vectors are the same while the reference pictures are different. In HEVC, motion vector scaling applies to both TMVP and AMVP for spatial and temporal neighboring candidates.

In artificial motion vector candidate generation, if a motion vector candidate list is not complete (i.e., less than the prescribed number of candidates are available), artificial motion vector candidates may be generated and inserted at the end of the list until the list includes the prescribed number of candidates. In the merge mode, there are two types of artificial MV candidates: a combined candidate derived only for B slices, and zero candidates used only for AMVP if the first type does not provide enough artificial candidates. For each pair of candidates that are already in the candidate list and have the necessary motion information, bi-directional combined motion vector candidates are derived based on a combination of a motion vector of a first candidate referring to a picture in list 0 and a motion vector of a second candidate referring to a picture in list 1.

In the pruning process for candidate insertion, candidates from different blocks may happen to be the same, which decreases the efficiency of a merge/AMVP candidate list. A pruning process may be applied to address this problem. The pruning process compares one candidate against the others in the current candidate list to avoid inserting an identical candidate in certain circumstances. To reduce the complexity, only a limited number of pruning processes may be applied, instead of comparing each potential candidate with all the other existing candidates.

A deblocking filter process in HEVC will now be described. The deblocking filter process is performed for each CU of a video block in the same order as the decoding process. First, vertical edges are filtered (i.e., horizontal filtering) and then horizontal edges are filtered (i.e., vertical filtering). Deblocking filtering is applied to block boundaries within the CU that are determined to be filtered, both for luma and chroma components. In some examples, 8×8 block boundaries are filtered while 4×4 block boundaries are not processed in order to reduce complexity. Two kinds of boundaries are involved in the deblocking filter process: TU boundaries and PU boundaries. CU boundaries are also considered, since CU boundaries are necessarily also TU and PU boundaries.

Figure 6:
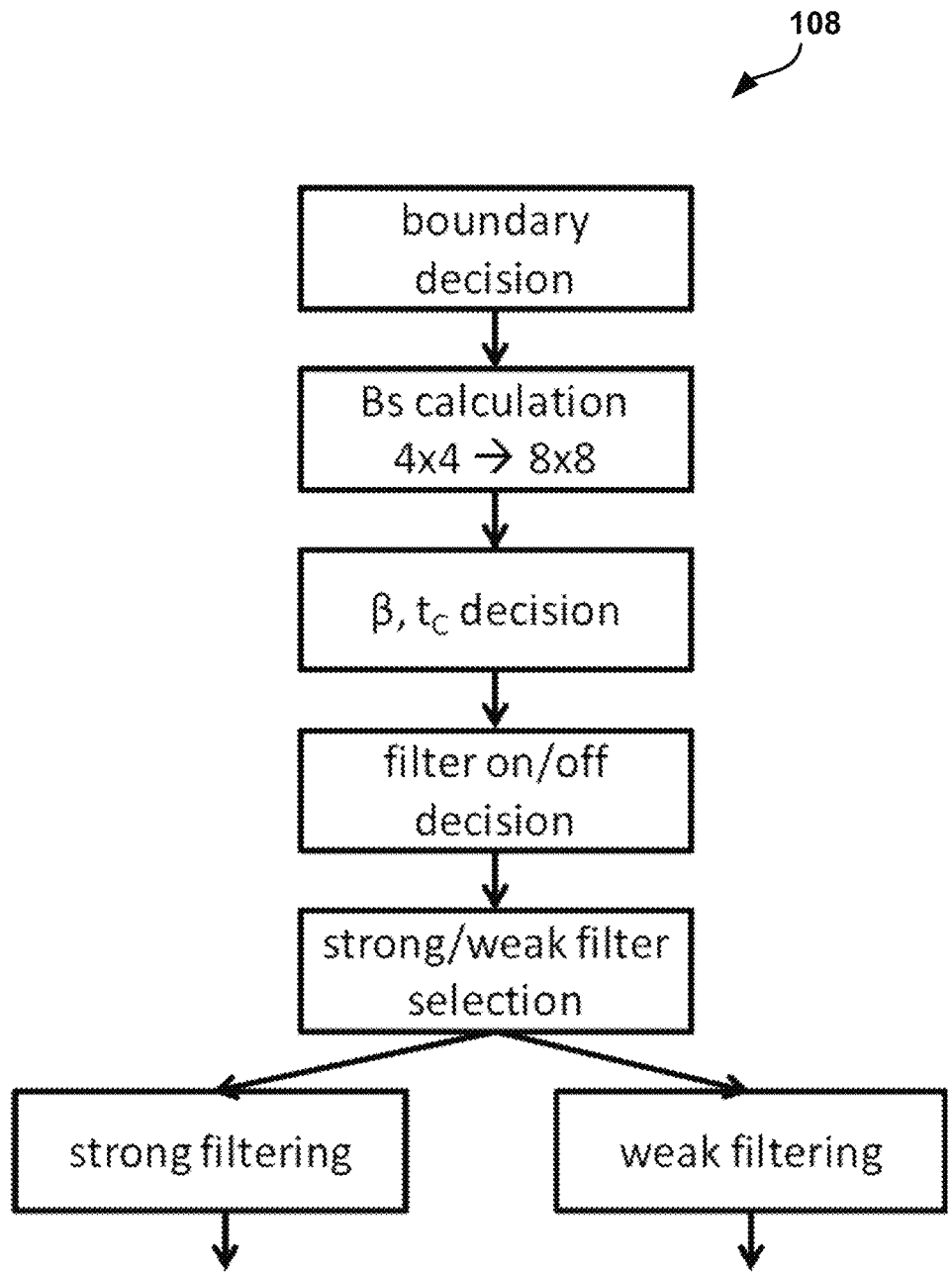
FIG. 6 is a flow diagram illustrating an example processing flow of a deblocking filter process.

FIG. 6 is a flow diagram illustrating an example processing flow 108 of a deblocking filter process. A boundary can have three filtering status values: no filtering, weak filtering, and strong filtering. Each filtering decision is based on boundary strength, Bs, and threshold values, $\beta$ and $t_C$.

Figure 7:
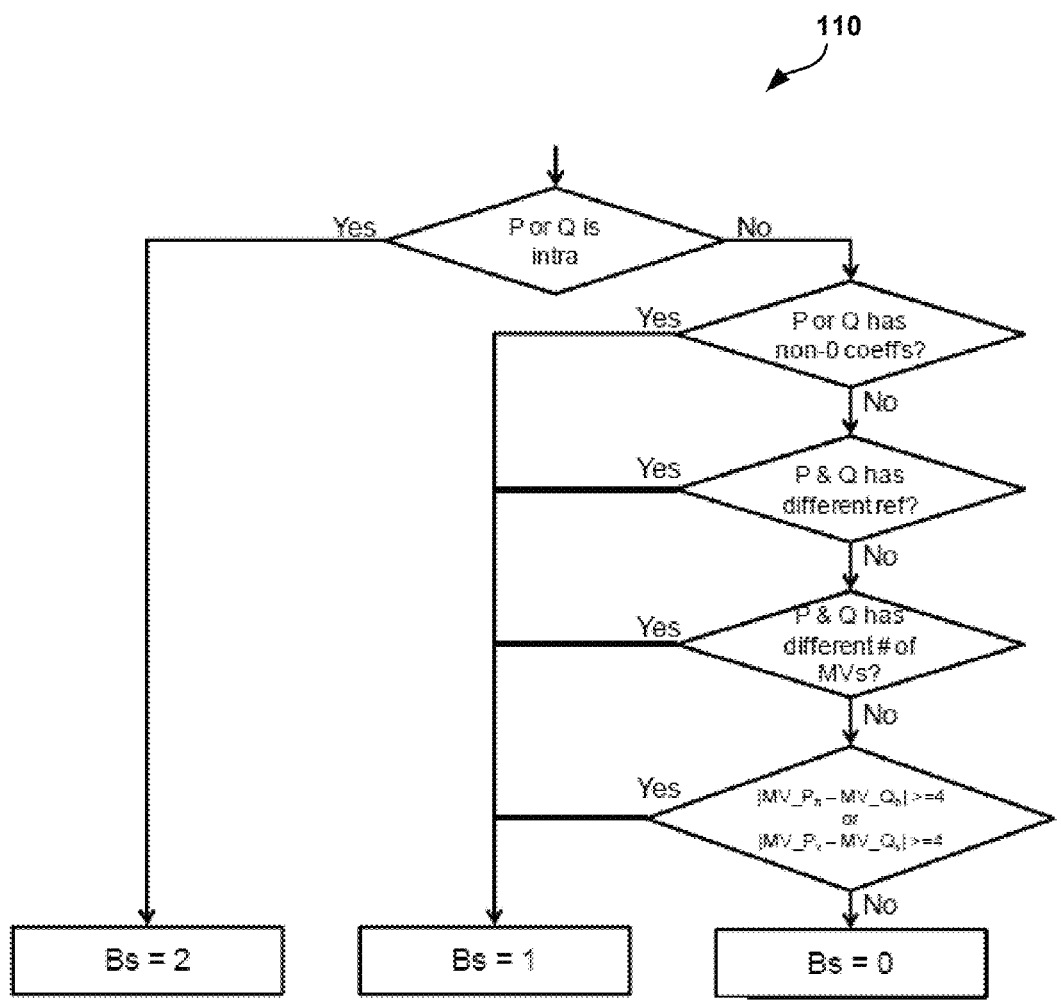
FIG. 7 is a flow diagram illustrating an example operation of a boundary strength (Bs) calculation for a deblocking filter process.

FIG. 7 is a flow diagram illustrating an example operation of a boundary strength (Bs) calculation 110 for a deblocking filter process. The boundary strength (Bs) reflects how strong a filtering process may be needed for the boundary. For example, a Bs value of 2 indicates strong filtering, a Bs value of 1 indicates weak filtering, and a Bs value of 0 indicates no deblocking filtering.

Let P and Q be defined as blocks that are involved in the filtering, where P represents the block located to the left (in the vertical edge case) or above (in the horizontal edge case) the boundary to be deblocked, and Q represents the block located to the right (in the vertical edge case) or above (in the horizontal edge case) the boundary to be deblocked. The operation illustrated in FIG. 7 indicates how the Bs value is calculated based on the intra coding mode, the existence of non-zero transform coefficients, reference pictures, number of motion vectors, and motion vector differences.

Figure 8:
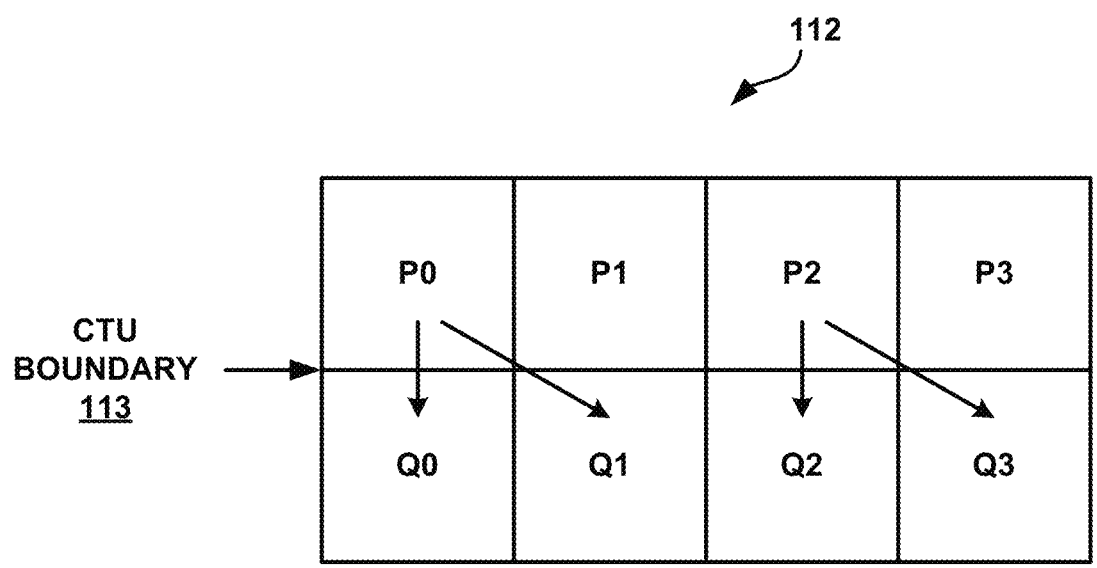
FIG. 8 is a conceptual diagram illustrating reused or referred information for a Bs calculation at a coding tree unit (CTU) boundary for a de-blocking filter process.

FIG. 8 is a conceptual diagram illustrating reused or referred information for a Bs calculation between pixels in a grid 112 at a coding tree unit (CTU) boundary 113 for a de-blocking filter process. The Bs is calculated on a 4×4 block basis, but it is re-mapped to an 8×8 grid. The maximum of the two values of Bs that correspond to 8 pixels consisting of a line in the 4×4 grid is selected as the Bs for boundaries in the 8×8 grid. At CTU boundary 113, information on every second block (on a 4×4 grid) to the left or above is re-used as depicted in FIG. 8, in order to reduce the line buffer memory requirement.

Threshold values $\beta'$ and $t_C'$ are involved in the filter on/off decision, strong and weak filter selection, and weak filtering process. The threshold values are derived from the value of the luma quantization parameter, Q, as shown in Table I below.

TABLE 1

Derivation of threshold variables from input Q

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| β' | 0 | 0 | 0 | 0 | 0 | 0 | 0 | 0 | 0 | 0 | 0 | 0 | 0 | 0 | 0 | 0 | 6 | 7 | 8 |
| $t_C'$ | 0 | 0 | 0 | 0 | 0 | 0 | 0 | 0 | 0 | 0 | 0 | 0 | 0 | 0 | 0 | 0 | 0 | 0 | 1 |

| Q | 19 | 20 | 21 | 22 | 23 | 24 | 25 | 26 | 27 | 28 | 29 | 30 | 31 | 32 | 33 | 34 | 35 | 36 | 37 |
|---|----|----|----|----|----|----|----|----|----|----|----|----|----|----|----|----|----|----|----|
| β' | 9 | 10 | 11 | 12 | 13 | 14 | 15 | 16 | 17 | 18 | 20 | 22 | 24 | 26 | 28 | 30 | 32 | 34 | 36 |
| $t_C'$ | 1 | 1 | 1 | 1 | 1 | 1 | 1 | 1 | 2 | 2 | 2 | 2 | 3 | 3 | 3 | 3 | 4 | 4 | 4 |

| Q | 38 | 39 | 40 | 41 | 42 | 43 | 44 | 45 | 46 | 47 | 48 | 49 | 50 | 51 | 52 | 53 |
|---|----|----|----|----|----|----|----|----|----|----|----|----|----|----|----|----|
| β' | 38 | 40 | 42 | 44 | 46 | 48 | 50 | 52 | 54 | 56 | 58 | 60 | 62 | 64 | — | — |
| $t_C'$ | 5 | 5 | 6 | 6 | 7 | 8 | 9 | 10 | 11 | 13 | 14 | 16 | 18 | 20 | 22 | 24 |

The variable β is derived from β' as follows:

$$\beta = \beta'*(1<<(\text{BitDepth}_Y-8))$$

The variable $t_C$ is derived from $t_C'$ as follows:

$$t_C = t_C'*(1<<(\text{BitDepth}_Y-8))$$

FIG. 9 is a conceptual diagram illustrating pixels in P block 116 and Q block 117 involved in an on/off filter decision and a strong/weak filter selection for a deblocking filter process at boundary 114. The filter on/off decision is made using four lines of pixels that cross boundary 114, which are each grouped as a unit (shown in FIG. 9 using black outlined boxes) to reduce computational complexity. The six pixels included in each of the two boxes in a first set of four lines 118 are used to determine whether the filter is on or off for first set of four lines 118. The six pixels included in each of the two boxes in second set of four lines 119 are used to determine whether the filter is on or off for the second set of four lines 119.

The following variables are defined for the on/off filter decision:

$$dp0 = |p_{2,0} - 2*p_{1,0} + p_{0,0}|$$

$$dp3 = |p_{2,3} - 2*p_{1,3} + p_{0,3}|$$

$$dq0 = |q_{2,0} - 2*q_{1,0} + q_{0,0}|$$

$$dq3 = |q_{2,3} - 2*q_{1,3} + q_{0,3}|$$

If $dp0+dq0+dp3+dq3<\beta$, filtering for the first set of four lines 118 is turned on, and the strong/weak filter selection process is applied. If this condition is not met, no filtering is done for the first set of four lines 118.

Additionally, if the condition is met, the variables dE, dEp1 and dEp2 are set as follows:
dE is set equal to 1

If $dp0+dp3<(\beta+(\beta>>1))>>3$, the variable $dEp1$ is set equal to 1

If $dq0+dq3<(\beta+(\beta>>1))>>3$, the variable $dEq1$ is set equal to 1

A filter on/off decision is made in a similar manner as described above for the second set of four lines 119.

If filtering is turned on, a decision is made between strong and weak filtering. The pixels involved are the same as those used for the filter on/off decision, as depicted in FIG. 9. If the following two sets of conditions are met, a strong filter is used for filtering of the first set of four lines 118. Otherwise, a weak filter is used.

$$2*(dp0+dq0)<(\beta>>2), |p3_0-p0_0|+|q0_0-q3_0|<(\beta>>3)$$
$$\text{and } |p0_0-q0_0|<(5*+t_C+1)>>1 \quad (1)$$

$$2*(dp3+dq3)<(\beta>>2), |p3_3-p0_3|+|q0_3-q3_3|<(\beta>>3)$$
$$\text{and } |p0_3-q0_3|<(5*t_C+1)>>1 \quad (2)$$

The decision on whether to select strong or weak filtering for the second set of four lines 119 is made in a similar manner.

For strong filtering, the filtered pixel values are obtained by the following equations. Note that three pixels are modified using four pixels as an input for each of P block 116 and Q block 117.

$$p_0' = (p_2 + 2*p_1 + 2*p_0 + 2*q_0 + q_1 + 4) >> 3$$

$$q_0' = (p_1 + ^2*p_0 + 2*q_0 + 2*q_1 + q_2 + 4) >> 3$$

$$p_1' = (p_2 + p_1 + p_0 + q_0 + 2) >> 2$$

$$q_1' = (p_0 + q_0 + q_1 + q_2 + 2) >> 2$$

$$p_2' = (2*p_3 + 3*p_2 + p_1 + p_0 + q_0 + 4) >> 3$$

$$q_2' = (p_0 + q_0 + q_1 + 3*q_2 + 2*q_3 + 4) >> 3$$

For weak filtering, the filtered pixel values are obtained by the following equations. Note that two pixels are modified using three pixels as an input for each of P block 116 and Q block 117.

Delta (Δ) is defined as follows.

$$\Delta = (9*(q_0-p_0) - 3*(q_1-p_1) + 8) >> 4$$

When abs(Δ) is less than $t_C*10$, $$\Delta = \text{Clip3}(-t_C, t_C, \Delta)$$

$$p_0' = \text{Clip1}_Y(p_0 + \Delta)$$

$$q_0' = \text{Clip1}_Y(q_0 - \Delta)$$

If dEp1 is equal to 1, $$\Delta p = \text{Clip3}(-(t_C>>1), t_C>>1, (((p_2+p_0+1)>>1)-p_1+\Delta)>>1)$$

$$p_1' = \text{Clip1}_Y(p_1 + \Delta p)$$

If dEq1 is equal to 1, $$\Delta q = \text{Clip3}(-(t_C>>1), t_C>>1, (((q_2+q_0+1)>>1)-q_1-\Delta)>>)$$

$$q_1' = \text{Clip1}_Y(q_1 + \Delta q)$$

The above described deblocking decisions are for filtering luma components. The boundary strength Bs for chroma filtering is inherited from luma. If Bs>1, chroma filtering is performed. No filter selection process is performed for chroma, since only one filter can be applied. The filtered sample values $p_0'$ and $q_0'$ are derived as follows.

$$\Delta = \text{Clip3}(-t_C, t_C, ((((q_0-p_0)<<2)+p_1-q_1+4)>>3))$$

$$p_0' = \text{Clip1}_C(p_0+\Delta)$$

$$q_0' = \text{Clip1}_C(q_0-\Delta)$$

Some specific techniques in 3D-HEVC will now be discussed. The 3D video extension of the HEVC standard (3D-HEVC) is under development by JCT-3V. The 3D-HEVC extension supports the coding of multiview video plus depth format.

Figure 10:
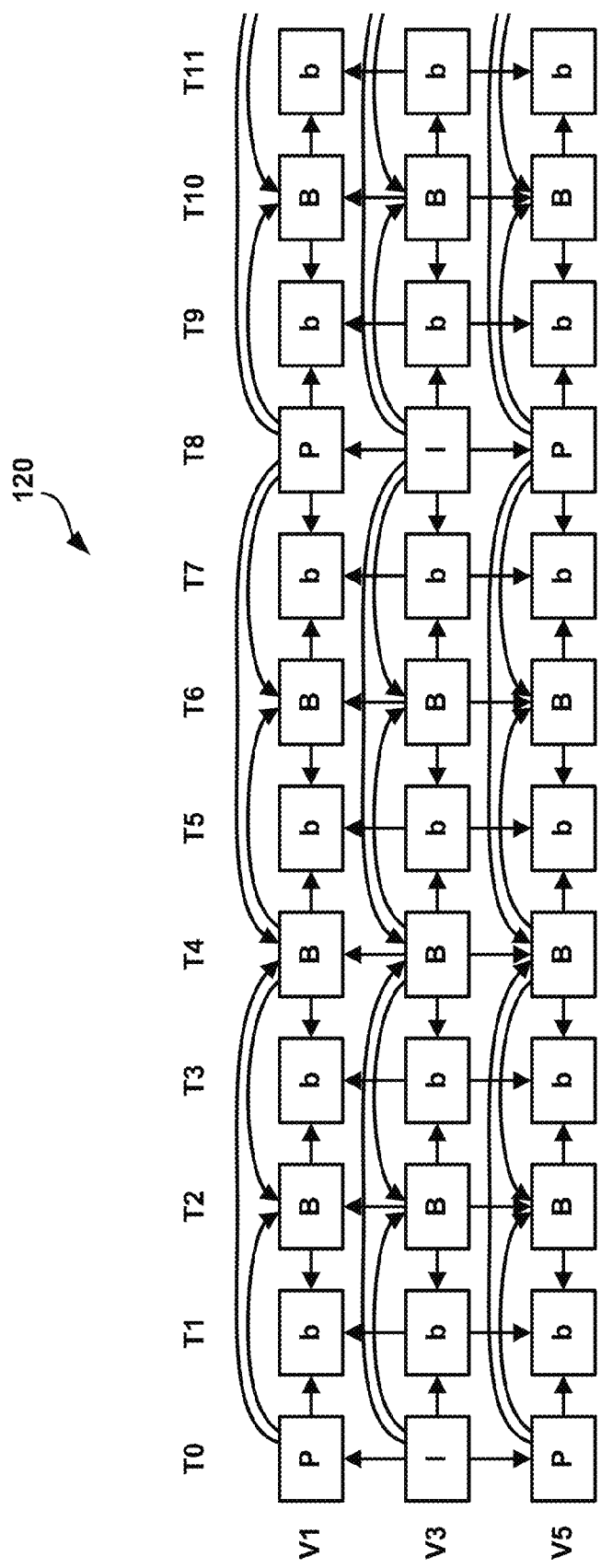
FIG. 10 is a conceptual diagram illustrating a multiview prediction structure for 3-view cases, where V3 denotes the base view and a picture in a non-base view (i.e., V1 or V5) may be predicted from pictures in the base view of the same time instance.

FIG. 10 is a conceptual diagram illustrating a multiview prediction structure 120 for 3-view cases, where V3 denotes the base view and a picture in a non-base view (i.e., V1 or V5) may be predicted from pictures in the base view of the same time instance. Inter-view sample prediction, which uses the multiview prediction structure 120 illustrated in FIG. 10, is supported by the multiview extension of HEVC (MV-HEVC). Both MV-HEVC and 3D-HEVC are compatible to HEVC in a way that the base or texture view (i.e., V3) is decodable by an HEVC decoder.

In MV-HEVC, a current picture in a non-base view (i.e., V1 or V5) may be predicted by both pictures in the same view and pictures in a reference view of the same time instance by including all of these pictures in reference picture lists for the current picture. A reference picture list of the current picture, therefore, contains both temporal reference pictures and inter-view reference pictures. A motion vector associated with a reference index corresponding to a temporal reference picture is denoted as a temporal motion vector. A motion vector associated with a reference index corresponding to an inter-view reference picture is denoted as a disparity motion vector.

The 3D-HEVC extension supports all the features of MV-HEVC such that inter-view sample prediction is also supported by 3D-HEVC. In addition, the 3D-HEVC extension supports more advanced texture-only coding tools and depth related/dependent coding tools, which are not supported by the MV-HEVC extension. The texture-only coding tools may require the identification of the corresponding blocks between views that belong to the same object. Disparity vector derivation, therefore, is a basic technology in 3D-HEVC.

One key aspect of multiview coding technology is to identify the corresponding blocks of different views by precise and efficient derivation of the disparity vectors. In 3D-HEVC, Neighboring Block based Disparity Vector (NBDV) derivation is designed in a way similar to the AMVP and merge modes in HEVC. Disparity vectors, however, are purely derived from neighboring blocks, so no additional bits are needed for further refinement or scaling of the disparity vectors. When inter-view sample prediction is enabled, the motion vectors corresponding to inter-view reference pictures, namely disparity motion vectors, are already present together with normal motion vectors, namely temporal motion vectors, in the motion field for a current block. The basic idea of NBDV derivation is to make use of the disparity motion vectors in the motion field, by checking only the spatial and temporal neighboring blocks.

Figure 11:
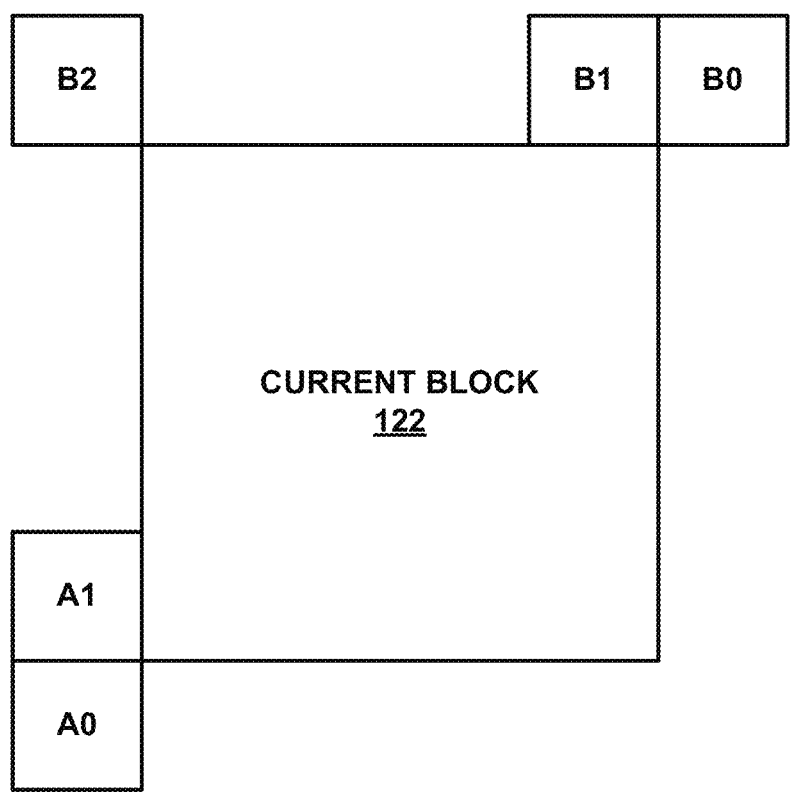
FIG. 11 is a conceptual diagram illustrating spatial neighboring blocks accessed for neighboring block-based disparity vector (NBDV) derivation, where the spatial neighboring blocks for NBDV derivation are the same as those accessed for merge mode and AMVP mode.

FIG. 11 is a conceptual diagram illustrating spatial neighboring blocks accessed for NBDV derivation for a current block 122, where the spatial neighboring blocks for NBDV derivation are the same as those accessed for merge mode and AMVP mode. The spatial neighboring blocks, A0, A1, B0, B1 and B2, accessed for NBDV are the same as those accessed for the AMVP and merge modes, as shown in FIGS. 4A and 4B and FIG. 11.

It is highly possible, however, that there is no spatial neighboring block of current block 122 that has any associated disparity motion vectors. In this case, the temporal neighboring blocks are also checked. The temporal neighboring blocks of current block 122 are the blocks in the co-located picture, as used in the TMVP mode and, in addition, another picture that may have a better chance to use disparity motion compensation, e.g., a random access picture or a picture that has a lowest temporalId. For each temporal picture, similar to the TMVP mode illustrated in FIG. 5A, the center and bottom-right blocks are checked. All the spatial and temporal neighboring blocks of current block 122 are checked in order. Once a disparity motion vector is identified, the disparity vector of current block 122 is derived to be the same as the identified disparity motion vector and the NBDV derivation process terminates. The disparity vector of current block 122 is used to identify the inter-view reference block in the picture of the reference view, as in, e.g., inter-view motion prediction and inter-view residual prediction.

In 3D-HEVC, it may be possible to store some derived disparity vectors as results of NBDV derivation to be further used for neighboring blocks. Such derived disparity vectors are named implicit disparity vectors (IDVs). For example, if NBDV derivation does not identify any disparity motion vectors from neighboring blocks, the spatial neighboring blocks may be checked again to identify any available IDVs of the spatial neighboring blocks to be used to derive the final disparity vector for current block 122. Recently, 3D-HEVC also included simplifications of the NBDV methods by checking fewer spatial and temporal neighboring blocks.

View synthesis prediction (VSP) in 3D-HEVC is realized by two major technical modules: Depth-Oriented NBDV (Do-NBDV) and Backward View Synthesis Prediction (BVSP).

In Do-NBDV derivation, the disparity vector generated by the NBDV scheme may be further refined using information in the coded depth map. In this way, the accuracy of the disparity vector may be enhanced by taking the benefit of the information coded in the base view depth map. The refinement steps are described as follows:
1. Locate a corresponding depth block based on the disparity vector derived by the NBDV scheme for a current PU in a previously coded reference depth view picture (such as in the base view) of the same access unit; the size of the corresponding depth block is the same as that of current PU.
2. Calculate a disparity vector for the current PU from the corresponding depth block based on the maximum value of the four corner pixel depth values. The maximum value is set equal to the horizontal component of the calculated disparity vector, while the vertical component of the disparity vector is set to zero.

The disparity vector from the NBDV scheme is then replaced by this newly derived disparity vector from the Do-NBDV scheme, and the refined disparity vector (from Do-NBDV) is used for inter-view motion prediction for the current PU. The unrefined disparity vector (from NBDV), however, may be used for inter-view residual prediction for the current PU. In addition, the refined disparity vector may be stored as the one motion vector of the current PU if it is coded in BVSP mode.

The BVSP mode is realized as a special merge mode candidate that has its starting motion vector set to be a disparity motion vector. Such a candidate is called a BVSP candidate. When a spatial neighboring block of a current PU is coded in a BVSP mode, the associated disparity vector and reference view index from the neighboring block are used to define an additional BVSP candidate for the current PU. The spatial merge mode candidate derived from such a spatial neighboring block is tagged with a BVSP flag equal to 1.

Figure 12:
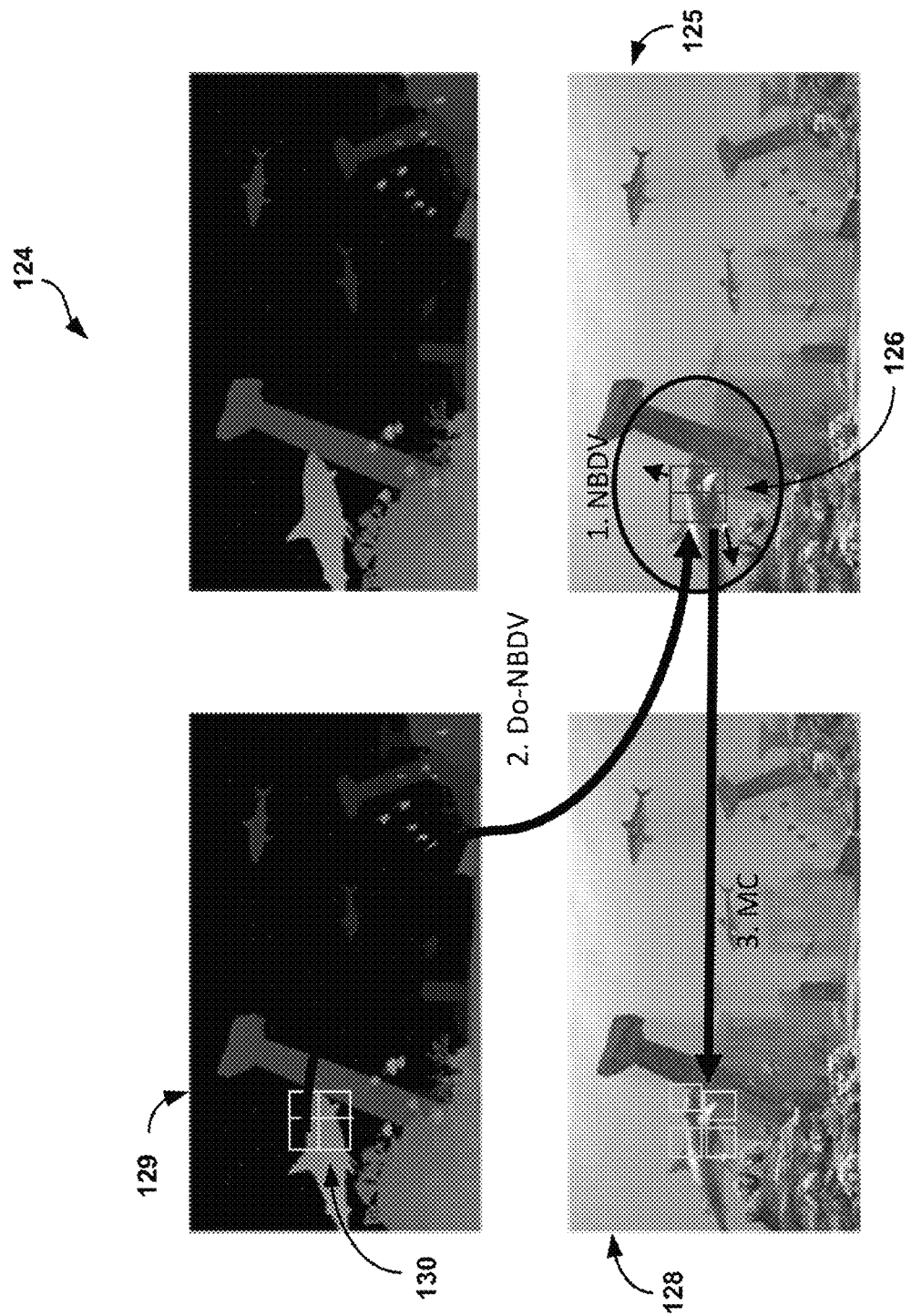
FIG. 12 is a conceptual diagram illustrating a backward view synthesis prediction (BVSP) mode that assigns different motion vectors for different sub-PUs of a PU.

FIG. 12 is a conceptual diagram illustrating a BVSP mode 124 that assigns different motion vectors for different sub-PUs of a current PU 126 in a current picture 125. In this disclosure, the current BVSP mode in 3D-HEVC may be referred to as the sub-PU BVSP mode. In the BVSP mode, first motion information is determined for current PU 126 from the spatial or temporal neighboring blocks of current PU 126. As described above, the first motion information may be selected as a BVSP candidate in a merge mode candidate list. The first motion information includes a disparity motion vector and an associated reference view index that identifies an inter-view reference picture 128. This first step of the BVSP mode may be substantially similar to NBDV derivation described above.

The current PU 126 is then further partitioned into sub-regions or sub-PUs. For example, a PU with its size denoted by N×M may be further partitioned into several sub-regions or sub-PUs with sizes equal to K×L (where K and L may be 8 or 4, but not both 4). For each sub-region or sub-PU, second motion information is determined that includes a separate disparity motion vector derived by accessing a corresponding one of depth blocks 130 in a reference depth view picture 129 associated with inter-view reference picture 128 identified by the reference view index associated with the first disparity vector. More specifically, for each sub-PU of current PU 126, a maximum value of the four corner pixels of the corresponding one of depth blocks 130 is selected and converted to a horizontal component of the disparity motion vector for the sub-PU; the disparity motion vector has a vertical component equal to zero. This second step of the BVSP mode may be substantially similar to Do-NBDV derivation described above.

After each sub-region or sub-PU of current PU 126 has its motion information predicted, the motion compensation engine of HEVC may be used to predict each sub-region or sub-PU of current PU 126 from inter-view reference picture 128 based on the second motion information for each sub-PU. In the BVSP mode, after performing motion compensation to predict each sub-PU of current PU 126, only the first disparity motion vector included in the first motion information selected for current PU 126 is stored for current PU 126, and the separate disparity vectors included in the second motion information for the sub-PUs are discarded.

With the BVSP mode, each PU may have more than one set of motion information, meaning that sub-PUs inside a PU may have different motion vectors. This is different from HEVC, where each PU only has one set of motion information. Typically in the BVSP mode, although the sub-PUs inside a PU may have different motion vectors, the reference index values for the sub-PUs are the same. The complexity increase of the BVSP mode mainly lies on increased power consumption, and the worst case complexity is similar to HEVC motion compensation as long as the size, as well as bi-prediction status, of the sub-PUs is never smaller than the size of the motion compensation block enabled in HEVC.

In 3D-HEVC, a depth view is coded after the associated texture view. When a PU in the depth view is coded, the motion information of the texture view within the co-located region of the PU may create a merge candidate for the current PU. In this case, the merge candidate may be referred to as the motion parameter inheritance (MPI) candidate, which contains a full set of motion information.

In JCT3V-E0184, Jicheng An et al., 3D-CE3.h related: Sub-PU level inter-view motion prediction," Joint Collaborative Team on 3D Video Coding Extensions of ITU-T SG 16 WP 3 and ISO/IEC JTC 1/SC 29/WG 11, 5th Meeting: Vienna, AT, 27 Jul.-2 Aug. 2013, use of a sub-PU level inter-view motion prediction method is described for the inter-view merge candidate, i.e., the candidate derived from a reference block in an inter-view reference picture.

Figure 13:
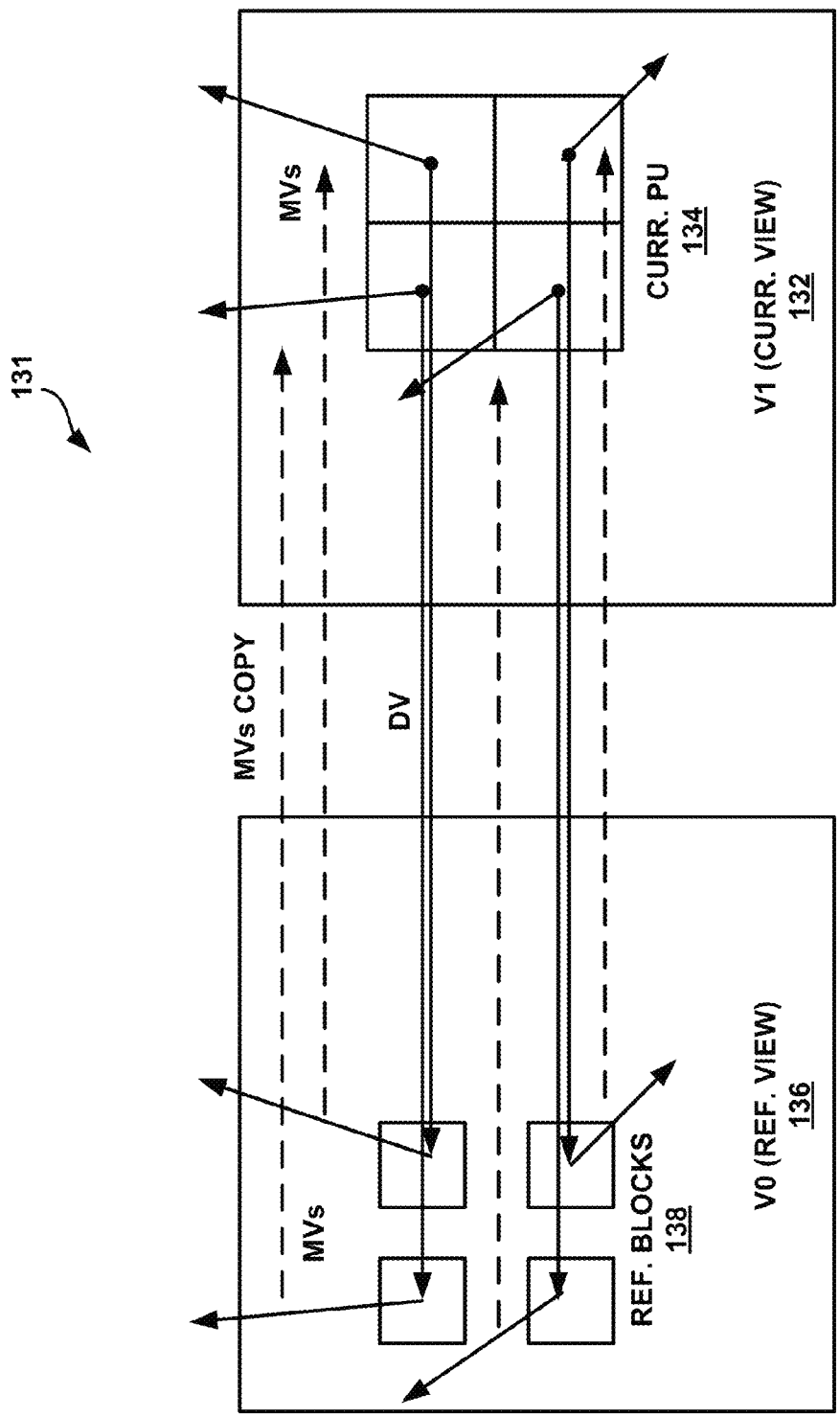
FIG. 13 is a conceptual diagram illustrating sub-PU level inter-view motion prediction.

FIG. 13 is a conceptual diagram illustrating sub-PU level inter-view motion prediction 131 for a current PU 134 in a current view (V1) 132. When inter-view motion prediction mode is enabled, a current PU 134 may correspond to a reference area with the same size as the current PU identified by the disparity vector in a reference view (V0) 136. In some cases, the reference area may have richer motion information than needed for generation of only one set of motion information for the current PU 134. A sub-PU level inter-view motion prediction (SPIVMP) method is therefore proposed in which current PU 134 is partitioned into multiple sub-PUs, and the disparity vector (DV) is used identify reference blocks 138 in reference view (V0) 136 for each of the sub-PUs of current PU 134. In the SPIVMP mode, each of the sub-PUs of current PU 134 has a full set of motion information copied from reference blocks 138 such that current PU 134 may contain multiple sets of motion information. The SPIVMP mode may be also signaled as a special merge mode candidate, similar to the sub-PU BVSP mode described above.

In U.S. provisional application No. 61/858,089, filed Jul. 24, 2013, entitled "ADVANCED MOTION PREDICTION FOR 3D VIDEO CODING," to Ying Chen and Li Zhang, it is proposed that the MPI candidate can also be extended in a way similar to sub-PU level inter-view motion prediction. For example, if the current depth PU has a co-located region that contains multiple PUs, the current depth PU may be separated into sub-PUs, each of which may have a different set of motion information. This method may be referred to as sub-PU MPI.

The sub-PU designs in 3D-HEVC, including sub-PU BVSP, sub-PU inter-view motion prediction and sub-PU MPI, described above, may experience some issues.

First, as described above, in the sub-PU BVSP mode, motion compensation is performed to predict each of the sub-PUs of a current PU based on separate sub-PU motion information derived based on corresponding depth blocks of an inter-view reference picture identified by a disparity motion vector selected for the current PU. After performing motion compensation to predict each of the sub-PUs, however, only the disparity motion vector corresponding to each reference picture list is stored for the current PU. In this case, when the current PU is used to predict a subsequent PU, the sub-PUs of the current PU are viewed as having the same motion vectors such that the sub-PU BVSP mode has little impact on improving accuracy of motion vector prediction.

Second, the current sub-PU design is only enabled when inter-layer prediction is enabled. The sub-PU design, however, may be applicable for improving accuracy of motion compensation use in single-layer prediction. In addition, the current sub-PU design is only applicable to the merge inter prediction mode in which no further refinement of the candidate motion vectors is allowed. The current sub-PU design, therefore, cannot be enabled for motion prediction modes where motion refinement is allowed, e.g., AMVP mode for HEVC based codecs.

Third, deblocking filters used in HEVC are typically kept unchanged in HEVC extensions, including 3D-HEVC. The current deblocking filter design in HEVC, however, may not filter boundaries of the sub-PUs because it is assumed in HEVC that blocks in the same TU inside one PU are motion compensated as a whole block of one single picture. In this case, no blocking artifacts are expected to be present or removed from within a PU. In order to deblock sub-PU boundaries without changing the deblocking filter design in the 3D-HEVC extension, this disclosure describes converting a sub-PU to a de-blocking friendly structure before a deblocking filter process is applied. For example, before de-blocking filtering process, each PU that utilizes the sub-PU design may be converted to one or more coding trees, where each sub-PU may become a PU in a CU that is a node of the respective coding tree. In this example, the coding tree structure is compatible to HEVC syntax design.

However, some additional issues may occur with the above solution. As a first example, if a prediction unit A (PU A) has been coded with normal inter prediction, and another prediction unit (PU B) within the same CU as PU A is coded with sub-PUs, the PUs will be need converted into two CUs and filtering may occur inside PU A, which is not sub-partitioned. As a second example, when one TU applies for an entire CU, which includes at least one PU with sub-PUs, the CU may be converted to multiple CUs, multiple CUs with the same TU is not supported by HEVC.

This disclosure describes several techniques to address the above described issues.

With respect to the first issue described above, in the sub-PU BVSP mode in 3D-HEVC, after performing motion compensation to predict each of the sub-PUs of the current PU based on separate sub-PU motion information derived based on corresponding depth blocks of an inter-view reference picture identified by a disparity motion vector selected for the current PU, only the disparity motion vector corresponding to each reference picture list is stored for the current PU. The single disparity motion vector is stored for each reference picture list even though the motion compensation of the PU is based on multiple motion vectors included in the separate motion information derived for the multiple sub-PUs of the current PU.

According to the techniques of this disclosure, for each PU predicted using the sub-PU BVSP mode, a video coding device, i.e., video encoder 20 and/or video decoder 30, preserves, e.g., stores or maintains, the separate motion information derived for each of the sub-PUs of the current PU even after motion compensation is performed. As an example, video encoder 20 and/or video decoder 30 may store the disparity motion vector derived for each of the sub-PUs in a memory, such as a decoded picture buffer, with a reference picture list that includes the inter-view reference picture identified by a reference view index associated with the disparity motion vector for the current PU.

The additional, richer motion information stored for the current PU may then be used to predict subsequent PUs for which the current PU is a neighboring block. For example, video encoder 20 and/or video decoder 30 may generate a merge mode candidate list of motion information for predicting a subsequent PU that includes the stored motion information for at least one of the sub-PUs of the current PU as a sub-PU BVSP candidate in the merge mode candidate list. In one example, if the subsequent PU is coded in the sub-PU BVSP mode, video encoder 20 and/or video decoder 30 may not need to derive the separate motion information for each of the sub-PUs of the subsequent PU. Instead, video encoder 20 and/or video decoder 30 may instead select the separate motion information as the sub-PU BVSP candidate from the merge mode candidate list of motion information for predicting the sub-PUs of the subsequent PU. The operation of predicting a PU in the sub-PU BVSP mode and storing the motion information derived for each of the sub-PUs of the PU is described in more detail below with respect to FIG. 17.

With respect to the second issue described above, this disclosure describes techniques for performing an advanced TMVP mode to predict sub-PUs of a PU in single layer coding for which motion vector refinement may be allowed. Video encoder 20 and/or video decoder 30 may be configured to perform the advanced TMVP mode, which includes determining motion vectors for the PU in at least two stages to derive motion information for the PU that includes different motion vectors and reference indices for each of the sub-PUs of the PU.

FIGS. 14A and 14B are conceptual diagrams illustrating the advanced TMVP mode to predict sub-PUs in a PU in single layer coding. As illustrated in FIG. 14A, the first stage 170 of the advanced TMVP mode determines a motion vector that identifies a corresponding block 174 in a reference picture for the current PU 173 in the current picture, and the second stage 172 of the advanced TMVP mode extracts multiple sets of motion information from sub-PUs of corresponding block 174 in the reference picture and assigns each of the sets of motion information to one of the sub-PUs of current PU 173 in the current picture. Each sub-PU of the current PU 173, therefore, is motion compensated separately. The motion vector in the first stage 170 may be derived from spatial and temporal neighboring blocks of the current PU 173. In one example, the first stage motion vector may be selected as a merge mode candidate among all the other merge mode candidates, which may or may not include a candidate similar to the TMVP candidate in HEVC. In another example, the first stage motion vector may be selected as an AMVP mode candidate among all the other AMVP mode candidates and refined. In this example, when a sub-PU encounters an unavailable motion vector for each prediction direction, a representative motion vector may be used.

Applicable to single-layer coding and sub-PU TMVP, video encoder 20 or video decoder 30 may determine motion refinement data, e.g., a motion vector difference, for a PU or CU that is signaled with the motion predictor indices for the MV candidate lists. In one example, for each prediction direction, a single motion vector difference may be determined, and is applicable to all motion vectors of the sub-PUs or PUs. In another example, for each prediction direction, separate motion vector differences may be determined for each of the sub-PUs or PUs. In addition, for each horizontal or vertical component, the motion vector difference values may be transformed, and the resulting transformed coefficients may be further quantized or truncated and coded similar to pixel residuals in video codecs.

In another example, similar to HEVC, the motion refinement data for sub-PU motion vectors may be transmitted from video encoder 20 to video decoder 30 when a sub-PU MV candidate is added to an AMVP mode candidate list and not added to a merge mode candidate list. In one alternative example, a sub-PU MV candidate may apply only if the reference index values associated with all the motion vectors of the sub-PUs or PUs are the same. In another alternative example, a sub-PU MV candidate may always apply and the reference index values associated with all the motion vectors of the sub-PUs are explicitly transmitted. In addition, if quantization or transform of the motion vector difference values applies, the motion vectors may be scaled toward one fixed reference picture. After the motion vector differences are collected, the differences are added to the scaled motion vectors. Afterwards, the new motion vectors are scaled back towards their respective different reference pictures identified by the different reference index values of the sub-PUs or PUs.

The following section provides example implementation details regarding the advanced TMVP mode, described above, for cases where the reference index values associated with the motion vectors of the sub-PUs or PUs are different. Identification of the first stage motion vector will be discussed first. The first stage motion vector is converted from the spatial neighboring blocks of the current PU, which contain temporal motion vectors. The spatial neighboring blocks belong to those used for typical motion vector prediction, e.g., the blocks used in AMVP and merge for HEVC.

When the spatial neighboring blocks have candidate motion vectors that are associated with different reference index values, one of the following decision processes is applied to decide which reference index is used to identify the reference picture from which to determine the sub-PU level motion information.

1. The blocks with a smallest reference index value are chosen. Among them, the one that is earlier accessed is chosen to return the temporal motion vector to be the "first stage vector." It is assumed that the blocks are accessed in a given order based on the relative spatial locations of the blocks.
2. The blocks with a smallest reference index value are chosen. The motion vectors of these blocks are averaged (if more than one) to be the "first stage vector," alternatively a medium operation may be used.
3. The reference index with a highest frequency among the reference indices of the neighboring blocks is chosen. Among the blocks having that reference index, either the motion vector that is first accessed is chosen, or average (e.g., medium) of the motion vectors is used to be the "first stage vector." Alternatively, other mathematic functions may be applied to obtain the first stage motion vector.
4. The reference index with a closest POC distance to the current picture is chosen. Among the blocks having that reference index, either the motion vector that is first accessed is chosen, or an average (e.g., medium or other mathematic function) of the motion vectors is used to be the "first stage vector."
5. A primary reference index is signaled in the slice header and blocks with a reference index equal to the primary reference index are chosen to produce the "first stage vector." with methods similar to those described above. When no block has a reference index equal to the primary reference index, methods described above to choose the reference index may be used.
6. Since the picture used for TMVP is typically fixed for each slice, as in AVC and HEVC, the primary reference index may be the same as the reference index indicating the TMVP.
7. The above reference index could be an index to either RefPicList0 or RefPicList1. Alternatively, a reference picture list union (RefPicListU) may generated by RefPicList0 and RefPicList1, and the reference index may be the index to the RefPicListU. Note that any picture identified by RefPicListU belongs to either RefPicList0 or RefPicList1 or both, and there is no picture that belongs to RefPicListU but not in RefPicList0 or RefPicList1. RefPicListU does not have two identical pictures. Alternatively, and in addition, RefPicListU may only contain temporal reference pictures within the same layer or marked as short-term pictures.
8. Alternatively, the reference index and the "first stage vector" may be selected from the merge mode candidates.
   a. In one example, the reference index and the "first stage vector" are selected from one spatial merge mode candidate derived from one relative block position, e.g., left neighboring block.
   b. Alternatively, the reference index and the "first stage vector" may be selected from the first available candidate in the merge mode candidate list.
   c. Furthermore, when the selected merge candidate uses bi-prediction, the motion vector and reference index may be selected from one of the merged sets of motion information.

When a reference index and the "first stage vector" are identified, the reference picture that is used to determine the sub-PU motion information is identified as well as the region in the reference picture corresponding to the current PU. In one case, a reference index may indicate a reference picture that is different than the picture to be used for TMVP due to, e.g., the reference index being derived and the picture used for TMVP being explicitly signaled. In this case, the reference index may be changed to identify the picture used for TMVP, and the motion vector may be scaled towards the picture used for TMVP based on POC distances.

In the above description, the identification of the "first stage vector" only utilizes spatial neighboring blocks. Alternatively, temporal neighboring blocks may be used to identify the "first stage vector," where the positions of the temporal neighboring blocks are similar to the blocks used in NBDV. Such positions include a center position of the current PU or a bottom-right position of the current PU, each being located in an identified reference picture.

Generation of sub-PU motion for TMVP will now be discussed. Each sub-PU of a current PU may locate a corresponding sub-PU within the corresponding block of the reference picture identified by the "first stage vector." A set of motion information derived from the motion information within the corresponding sub-PU of the reference picture is generated for each of the sub-PUs in the current PU, similar to sub-PU level inter-view motion prediction described above. If the motion information of the corresponding sub-PUs is unavailable, the "first stage vector" may be used for the sub-PUs of the current PU as a substitute. Since each sub-PU may have a different reference index for each prediction direction, several techniques are proposed for scaling the motion vectors to a target reference picture for each reference picture list.

As illustrated in FIG. 14B, the reference picture 183 identified by the motion vector 186 inside the corresponding sub-PU 185 of the motion source reference picture 182 is PicOri, the reference picture (i.e., motion source picture) 182 containing the corresponding sub-PU 185 is PicT, the current picture 180 is PicCur and the target reference picture 184 is PicTarg. It is assumed for purposes of discussion that the motion vector 186 is MV, and the scaled motion vector is MV' (i.e., the motion vector predictor 188 for predicting a sub-PU of PU 181 in current picture 180. Note that when a temporal motion vector 187 identified in the first stage of the advanced TMVP mode is associated with a reference picture that is not the picture from which the sub-PU motion information is derived, scaling of motion vectors based on POC distance may be also possible.

1. Scale the motion vector towards a fixed reference index of the current picture: MV'=MV*(POC(PicTarg)−POC(PicCur))/(POC(PicOri)−POC(PicT)), wherein the POC( ) function returns the POC value of a given picture. Note that the above multiplication and deviation operations can be simplified in a way similar as in HEVC TMVP.
   a. The fixed reference index may be the same for the whole slice, e.g., it may be set equal to 0 as in HEVC.
   b. The fixed reference index may be derived from the spatial neighboring blocks.
2. Scale the motion vector always towards the reference picture of the corresponding sub-PU, which is PicOri: MV'=MV*(POC(PicOri)−POC(PicCur))/(POC(PicOri)−POC(PicT)).
3. Scale the motion vector always towards the co-located picture, which is PicT: MV'=MV*(POC(PicT)−POC(PicCur))/(POC(PicOri)−POC(PicT)).

As indicated above, the target reference picture from each reference picture list is set to the reference picture that has a reference index equal to 0 in the reference picture list. In another example, the target reference picture from each reference picture list is set to the same reference picture identified together with the "first stage vector." as described above. The operation of the advanced TMVP for sub-PU level motion vector prediction is described in more detail below with respect to FIG. 19.

With respect to the third issue described above, this disclosure describes techniques related to deblocking filter processes applied to CUs of a video block that include at least one PU with multiple sub-PUs. The techniques of this disclosure enable sub-PU boundaries to be deblocked by converting the sub-PUs to a deblocking friendly structure so that HEVC deblocking filters may continue to be used for 3D-HEVC blocks. In this way, the input to the deblocking filter may change to enable filtering of the blocky artifacts along the sub-PUs boundaries while keeping the deblocking filter unchanged. In this disclosure, a CU that is at least partially coded with sub-PUs is referred to as an advanced CU, and a PU coded with sub-PUs within an advanced CU coded is referred to an advanced PU. Other PUs in the advanced CU, if any, are referred to as normal PUs.

Several techniques are described in this disclosure to introduce the edges for the sub-PUs to the deblocking filter in order to eliminate the artifacts along the sub-PU boundaries. A sub-PU conversion process, as described in this disclosure, may be introduced in 3D-HEVC right before a de-blocking filtering process, i.e., after reconstructing a video block for storage as a reference picture but before actually storing the reconstructed video block in a decoded picture buffer of video encoder 20 and/or video decoder 30.

In a first example, right before applying a deblocking filter to the CU that includes PUs with sub-PUs, video encoder 20 and/or video decoder 30 may be configured to convert each PU that utilizes the sub-PU design into one or more coding trees such that each of the sub-PUs may become a PU in the coding units that are the nodes of the coding trees. In this example, the sub-PU boundaries are converted to artificial PU boundaries for purposes of the deblocking filter. The coding tree structure is preferably compatible to HEVC syntax design.

In other examples, prior to applying a deblocking filter to a CU of the video block that includes the PU with the sub-PUs, video encoder 20 and/or video decoder 30 may be configured to instead convert the CU in order to create artificial PU boundaries or artificial TU boundaries at the sub-PU boundaries. In one example, video encoder 20 and/or video decoder 30 may be configured to convert a transform tree of the CU in order to associate the PU with a transform tree hierarchy and associate each of the sub-PUs with a TU. In this example, the sub-PU boundaries are converted to artificial TU boundaries for purposes of the deblocking filter. In another example, video encoder 20 and/or video decoder 30 may be configured to convert the CU to a coding tree in order to associate the PU with a CU and associate each of the sub-PUs with a PU. In this example, the sub-PU boundaries are converted to artificial PU boundaries for purposes of the deblocking filter. The coding tree structure is preferably compatible to HEVC syntax design.

In any of the above examples, after converting the sub-PUs into deblocking friendly structures, the deblocking filter may be applied to the PU boundaries between two adjacent PUs of the CU and/or the TU boundaries between two adjacent TUs of the CU, including the artificial PU boundaries and the artificial TU boundaries.

For the example described above in which the transform tree of the CU is converted in order to associate the PU with a transform tree hierarchy and associate each of the sub-PUs with a TU such that the sub-PU boundaries are converted to artificial TU boundaries, one or more of the following decisions processes may be applied.

1. When the transform tree has a root with split_transform_flag equal to 1, the nodes corresponding to the normal PU (if any) of the advanced CU are not changed.
2. When the transform tree has a root with split_transform_flag equal to 1, a node in an advanced PU is changed to introduce a transform tree hierarchy as follows:
   a. For the current node, if the split_transform_flag is 0, and the TU size is larger than the sub-PU size, set the split_transform_flag to 1, and for each of the four child nodes, the following apply:
      i. Set the cbf_luma, cbf_cb, and cbf_cr of the node to be the same as that of the parent node and split_transform_flag equal to 0;
      ii. Set the current node to the child node, and go to step a.
   b. For the current node, if the split_transform_flag is 1, for each of the four child nodes, the following applies: set the current node to the child node, and go to step a.
3. Alternatively, when a transform tree hierarchy is introduced for a PU and cbf_luma, cbf_cb, and cbf_cr are set to a newly split node, the cbf_luma, cbf_cb, and cbf_cr of the node are set to 0.
4. Alternatively, when a transform tree hierarchy is introduced for a PU and cbf_luma (or cbf_cb, or cbf_cr) are set to a newly split node, the cbf_luma (or cbf_cb, or cbf_cr) of the node is set to any non-zero positive integer value (e.g., 1) if cbf_luma (or cbf_cb, or cbf_cr) is unequal to 0, or 0 otherwise.
5. When the transform tree has a root with split_transform_flag equal to 0, a normal PU (if any) is split into transform units, with the following steps in order.
   a. The split_transform_flag of the CU is first set to 1.
   b. If the partition of the CU is N×N, the normal PU corresponds to one node. If the partition of the CU is 2N×N or N×2N, the normal PU corresponds to two nodes.
   c. Each of the above nodes within a normal PU is set to have split_transform_flag set to 0 and cbf_luma, cbf_cb, and cbf_cr set equal to cbf_luma, cbf_cb, and cbf_cr of the original transform unit covering the whole advanced CU.
d. For each of the advanced PUs of the CU, 1 or 2 nodes covering the square region of the PU are first generated, and, for each node, the transform tree hierarchy is introduced similar as in step 2, 3 or 4 above.
6. Alternatively to step 5 above, for each of the above nodes within a normal PU, cbf_luma, cbf_cb, and cbf_cr are set equal to 0.
7. Alternatively to step 4 above, for each of the above nodes within a normal PU, its cbf_luma (or cbf_cb or cbf_cr) is set equal to any non-zero positive integer value (e.g., 1) if cbf_luma (or cbf_cb, or cbf_cr) is unequal to 0, or 0 otherwise.

For the example described above in which the CU is converted to a coding tree in order to associate the PU with a CU and associate each of the sub-PUs with a PU such that the sub-PU boundaries are converted to artificial PU boundaries, one or more of the following decisions processes may be applied.
1. After conversion, the current advanced CU will become the root of the coding tree, namely the converted root, which is a quad-tree containing at least four coding units.
2. For any normal PU in an advanced CU, it is set to be one or more coding units.
3. In addition, the CBF value of each component of the converted coding units converted from the normal PUs in an advanced CU is further set to be 0. This way, the filtering within one normal inter prediction PU is avoided even if the PU has been converted to two CUs.
   a. For any advanced PU, the CBF value of the converted coding tree or coding unit that is one-level below the converted root, is set to be non-zero if the CBF value of the current advanced CU is non-zero.
   b. Furthermore, for any converted CU or PU or coding tree inside an advanced PU, if it originally does not have a CBF value signaled, it is set to be the same as the CBF value of its parent node in the quad-tree, or to the same zero or non-zero status as the CBF value of its parent node in the quad-tree.
4. Alternatively, for an advanced CU, one unique transform unit cannot be applied for the whole CU, meaning that if a normal PU is inside the advanced CU, it must contain a transform unit which is not shared by another PU of the CU.
   a. Alternatively, or in addition, for each advanced PU, the leaf nodes of the transform tree are distributed one level higher than the sub-PU or deeper, meaning that each of the four sub-PUs within a converted CU has a unique transform unit signaled.
5. More specifically, if a CU with 2 L×2 L size contains a PU that utilizes the sub-PU design, then the following conversion is performed for all PUs in the CU. A split flag equal to 1 is set for the current advanced CU and the following apply and the current node is set to be the CU:
   a. For each of the one-quarter square areas of the current node in raster scan order, the following apply:
      i. Set this one-quarter area as a child node.
      ii. If the child node is not coded with sub-PUs, it is set to be a coding unit (with split flag equal to 0) with 2N×2N partition.
         1. Alternatively, or in addition, the CBF value of each component of the child node is set to be 0.
         2. Alternatively, or in addition, the TU split flag of the coding unit is set to be 0.
      iii. Else, if the child node is coded with sub-PUs, and contains more than 1 sub-PU, a split flag is set to 1 for the child node (thus considered as a coding tree) and the following apply:
         1. Alternatively, in addition, if the CBF value is not present for the child node, it is set equal to be the CBF value of the higher level current node (the parent node of this child node).
         2. Set the child node as the current node and go to step a.
      iv. Else, if the child node contains only 1 sub-PU, the child node is set to be the leaf of the coding tree, thus a coding unit (with split flag equal to 0).
         1. Partition mode of the child node is set to be the partition mode of the sub-PU
            a. If partition mode of the sub-PU is 2N×2N, the sub-PU contains one 2N×2N block and partition mode of the coding unit is set to be 2N×2N.
            b. If partition mode of the sub-PU is N×2N, the sub-PU contains two N×2N blocks and partition mode of the coding unit is set to be N×2N.
            c. If partition mode of the sub-PU is 2N×N, the sub-PU contains two 2N×N blocks and partition mode of the coding unit is set to be 2N×N.
         2. Alternatively, or in addition, if the CBF value is not present for the child node, it is set equal to be the CBF value of the higher level current node (the parent node of this child node).
         3. Alternatively, or in addition, the TU split flag of the coding unit is set to be 0.

As another alternative for the example described above in which the transform tree of the CU is converted in order to associate the PU with a transform tree hierarchy and associate each of the sub-PUs with a TU such that the sub-PU boundaries are converted to artificial TU boundaries, one or more of the following decisions processes may be applied for part of each sub-PU.
1. When the transform tree has a root with split_transform_flag equal to 1, the normal nodes that contain only normal PUs (or part of normal PUs) of the advanced CU are not changed.
2. When the transform tree has a root with split_transform_flag equal to 1, an advanced node that contains any sub-PU (or part of sub-PU) is changed to introduce transform tree hierarchy as follows:
   a. For the current node, if it contains any sub-PU (or part of sub-PU), and the split_transform_flag is 0, and the TU size is larger than the sub-PU size, set the split_transform_flag to 1, and for each of the four child nodes, the following apply:
      i. Set the cbf_luma, cbf_cb, and cbf_cr of the node to be the same as that of the parent node and split_transform_flag equal to 0;
      ii. Set the current node to the child node, and go to step a.
   b. For the current node, if the split_transform_flag is 1, for each of the four child nodes, the following applies: set the current node to the child node, and go to step a.
3. Alternatively, when transform tree hierarchy is introduced for a node and cbf_luma, cbf_cb, and cbf_cr are set to a newly split node, the cbf_luma, cbf_cb, and cbf_cr of the newly split node are set to 0.
4. Alternatively, when transform tree hierarchy is introduced for a node and cbf_luma, cbf_cb, and cbf_cr are set to a newly split node, the cbf_luma (or cbf_cb, or cbf_cr) of the newly split node is set to any non-zero positive integer value (e.g., 1) if cbf_luma (or cbf_cb, or cbf_cr) is unequal to 0, or 0 otherwise.
5. When the transform tree has a root with split_transform_flag equal to 0, a normal node that contains only normal PUs (or part of normal PUs) has to be split into transform units, with the following steps in order.
   a. The split_transform_flag of the CU is first set to 1.
   b. If the partition of the CU is N×N, the normal PU corresponds to one normal node. If the partition of the CU is 2N×N or N×2N, the normal PU corresponds to two normal nodes. If the partition of the CU is 2N×nU, 2N×nD, nL×2N or nR×2N, the normal PU corresponds to 0 or 2 normal nodes.
   c. Each of the above normal nodes is set to have split_transform_flag set equal to 0 and cbf_luma, cbf_cb, and cbf_cr set equal to cbf_luma, cbf_cb, and cbf_cr of the original transform unit covering the whole advanced CU.
   d. For each of the advanced nodes that contains any sub-PU (or part of sub-PU) of the CU, the transform tree hierarchy is introduced similar as in step 2, 3 or 4 above.
6. Alternatively to step 5 above, for each of the above normal nodes, cbf_luma, cbf_cb, and cbf_cr are set equal to 0.
7. Alternatively to step 4 above, for each of the above normal nodes, its cbf_luma (or cbf_cb or cbf_cr) is set equal to any non-zero positive integer value (e.g., 1) if cbf_luma (or cbf_cb, or cbf_cr) is unequal to 0, or 0 otherwise.

Some example implementation details are provided below. The text below indicates proposed modifications to the 3D-HEVC WD1 for implementation of some of the techniques described in this disclosure.

Decoding Process
H.8.1 General Decoding Process
   3. The processes in subclauses 8.4, 8.5, 8.6, 8.7 and 8.8 specify decoding processes using syntax elements in all syntax structure layers. It is a requirement of bitstream conformance that the coded slices of the picture shall contain slice segment data for every coding tree unit of the picture, such that the division of the picture into slices, the division of the slices into slice segments, and the division of the slice segments into coding tree units each forms a partitioning of the picture.

H.8.5.3.3.2 Reference Picture Selection Process
Input to this process is a reference index refIdxLX.
Output of this process is a reference picture consisting of a two-dimensional array of luma samples refPicLX$_L$ and two two-dimensional arrays of chroma samples refPicLX$_{Cb}$ and refPicLX$_{Cr}$.
The output reference picture RefPicListX[refIdxLX] consists of a pic_width_in_luma_samples by pic_height_in_luma_samples array of luma samples refPicLX$_L$ and two PicWidthInSamplesC by PicHeightInSamplesC arrays of chroma samples refPicLX$_{Cb}$ and refPicLX$_{Cr}$.
The reference picture sample arrays refPicLX$_L$, refPicLX$_{Cb}$, and refPicLX$_{Cr}$ correspond to decoded sample arrays $S_L$, $S_{Cb}$, and $S_{Cr}$ derived by subclause 8.7 and subclause 8.8 for a previously-decoded picture.

H.8.7 Transform Tree Modification Process
H.8.7.1 General
Input to this process are: split flag array of coding tree split_cu_flag, partition mode array of coding unit PartMode, split flag of transform tree split_transform_flag, sub prediction unit flag array of coding unit subPuFlag, sub prediction unit size subPuSize. Output of this process are the modified split flag array of transform tree split_transform_flag.
For each coding unit, if it is coded in inter prediction mode and it contains prediction unit that utilizes sub prediction unit design, the split flag of transform tree is modified to make sub prediction unit boundary be transform unit boundary:
   The modification process of transform tree specified in subclause 8.7.2 is invoked with the luma location (xCb, yCb), the luma location (xB0, yB0) set equal to (0, 0), luma coding block size nCbS set equal to (1<<Log 2MaxCbSize), coding tree depth cuDepth set equal to 0, split flag array of coding tree split_cu_flag, partition mode array of coding unit PartMode, split flag array of transform tree split_transform_flag, sub prediction unit flag array subPuFlag and sub prediction unit size subPuSize as inputs, and the modified split flag array of transform tree split_transform_flag as output.

H.8.7.2 Transform Tree Modification Process of Coding Unit that Contains Sub Prediction Unit
Inputs to this process are:
   a luma location (xCb, yCb) specifying the top-left sample of the current luma coding block relative to the top-left luma sample of the current picture,
   a luma location (xB0, yB0) specifying the top-left sample of the current luma block relative to the top-left sample of the current luma coding block,
   luma coding block size nCbS,
   a variable specifying coding tree depth cuDepth,
   split flag array of coding tree split_cu_flag,
   split flag array of transform tree split_transform_flag,
   sub prediction unit flag array subPuFlag,
   sub prediction unit size subPuSize,
Output of this process is the modified:
   split flag array of transform tree split_transform_flag,
Depending on the value of split_cu_flag[xCb+xB0][yCb+yB0][cuDepth], the following applies:
   If split_cu_flag[xCb+xB0][yCb+yB0][cuDepth] is equal to 1, the following ordered steps apply:
   1. The variables xB1 and yB1 are derived as follows:
      The variable xB1 is set equal to xB0+(nCbS>>1).
      The variable yB1 is set equal to yB0+(nCbS>>1).
   2. The modification process of transform tree as specified in this subclause is invoked with the luma location (xCb, yCb), the luma location (xB0, yB0), luma coding block size nCbS set equal to (nCbS>>1), coding tree depth cuDepth set equal to cuDepth+1, split flag array of coding tree split_cu_flag, partition mode array of coding unit PartMode, split flag array of transform tree split_transform_flag, sub prediction unit flag array subPuFlag, sub prediction unit size subPuSize, as inputs, and the modified split flag array of transform tree split_transform_flag as output.
   3. The modification process of transform tree as specified in this subclause is invoked with the luma location (xCb, yCb), the luma location (xB1, yB0), luma coding block size nCbS set equal to (nCbS>>1), coding tree depth cuDepth set equal to cuDepth+1, split flag array of coding tree split_cu_flag, partition mode array of coding unit PartMode, split flag array of transform tree split_transform_flag, sub prediction unit flag array subPuFlag, sub prediction unit size subPuSize, as inputs, and the modified split flag array of transform tree split_transform_flag as output.
   4. The modification process of transform tree as specified in this subclause is invoked with the luma location (xCb, yCb), the luma location (xB0, yB1), luma coding block size nCbS set equal to (nCbS>>1), coding tree depth cuDepth set equal to cuDepth+1, split flag array of coding tree split_cu_flag, partition mode array of coding unit PartMode, split flag array of transform tree split_transform_flag, sub prediction unit flag array subPuFlag, sub prediction unit size subPuSize, as inputs, and the modified split flag array of transform tree split_transform_flag as output.

5. The modification process of transform tree as specified in this subclause is invoked with the luma location (xCb, yCb), the luma location (xB1, yB1), luma coding block size nCbS set equal to (nCbS>>1), coding tree depth cuDepth set equal to cuDepth+1, split flag array of coding tree split_cu_flag, partition mode array of coding unit PartMode, split flag array of transform tree split_transform_flag, sub prediction unit flag array subPuFlag, sub prediction unit size subPuSize, as inputs, and the modified split flag array of transform tree split_transform_flag as output.

Otherwise (split_cu_flag[xCb+xB0][yCb+yB0][cuDepth] is equal to 0), if nCbS is larger than subPUSize, following ordered steps apply:

1. The variables xB1 and yB1 are derived as follows:
   Variable xB1 is set equal to xB0+(nCbS>>1).
   Variable yB1 is set equal to yB0+(nCbS>>1).

2. Derive variable subPuDeblockingFlag by following order steps:
   subPuDeblockingFlag is set equal to 0.
   If subPuFlag [xCb+xB0][yCb+yB0] is equal to 1, subPuDeblockingFlag is set equal to 1.
   If subPuFlag [xCb+xB1][yCb+yB0] is equal to 1, subPuDeblockingFlag is set equal to 1.
   If subPuFlag [xCb+xB0][yCb+yB1] is equal to 1, subPuDeblockingFlag is set equal to 1.
   If subPuFlag [xCb+xB1][yCb+yB1] is equal to 1, subPuDeblockingFlag is set equal to 1.
   If PartMode[xCb+xB0][yCb+yB0] is equal to PART_nL×2N, or PartMode[xCb+xB0][yCb+yB0] is equal to PART_nR×2N, or PartMode[xCb+xB0][yCb+yB0] is equal to PART_2N×nU, or PartMode[xCb+xB0][yCb+yB0] is equal to PART_2N×nD, subPuDeblockingFlag is set equal to 0.

3. If subPuDeblockingFlag is equal to 1, the following ordered steps apply:
   if split_transform_flag[xCb+xB0][yCb+yB0][cuDepth] is equal to 0, set split_transform_flag[xCb+xB0][yCb+yB0][cuDepth] to be equal to 1.
   The modification process of transform tree specified in subclause 8.7.3 is invoked with the luma location (xCb, yCb), luma location (xB0, yB0), the coding tree depth cuDepth the block size nCbS, split flag array of transform tree split_transform_flag, sub prediction unit flag array of prediction unit subPuFlag, sub prediction unit size array of prediction unit subPuSize as inputs, and the modified split flag array of coding tree split_transform_flag as output.

H.8.7.3 Transform Tree Modification Process of Luma Coding Block

Inputs to this process are:
a luma location (xCb, yCb) specifying the top-left sample of the current luma prediction block relative to the top-left luma sample of the current picture,
a luma location (xB0, yB0) specifying the top-left sample of the current luma block relative to the top-left sample of the current luma coding block.
variables specifying block size nCbS, a variable specifying the transform tree depth trafoDepth, split flag array of transform tree split_transform_flag, sub prediction unit flag array subPuFlag, sub prediction unit size subPuSize, Output of this process is the modified:
split flag array of transform tree split_transform_flag, If nCbS is larger than subPUSize, following ordered steps apply.

The variables xB1 and yB1 are derived as follows:
The variable xB1 is set equal to xB0+(nCbS>>1).
The variable yB1 is set equal to yB0+(nCbS>>1).

For x in xB0, xB1
 For y in yB0, yB1
  if subPuFlag[xCb+x][yCb+y] is equal to 1
   if split_transform_flag[xCb+x][yCb+y][trafoDepth+1] is equal to 0
    set split_transform_flag[xCb+x][yCb+y][trafoDepth+1] to be equal to 1.
   The modification process of transform tree specified in this subclause is invoked with the luma location (xCb, yCb), luma location (xCb+x, yCb+y), the transform tree depth trafoDepth is set equal to trafoDepth+1, the block size nCbS is set equal to (nCbS>>1), split flag array of transform tree split_transform_flag, sub prediction unit flag array subPuFlag, sub prediction unit size subPuSize as inputs, and the modified split flag array of coding tree split_transform_flag as output.
  otherwise (if split_transform_flag[xCb+x][yCb+y][trafoDepth+1] is equal to 1),
   The modification process of transform tree specified in this subclause is invoked with the luma location (xCb, yCb), luma location (xCb+x, yCb+y), the transform tree depth trafoDepth is set equal to trafoDepth+1, the block size nCbS is set equal to (nCbS>>1), split flag array of transform tree split_transform_flag, sub prediction unit flag array subPuFlag, sub prediction unit size subPuSize as inputs, and the modified split flag array of coding tree split_transform_flag as output.

H.8.8 in-Loop Filter Process

Figure 15:
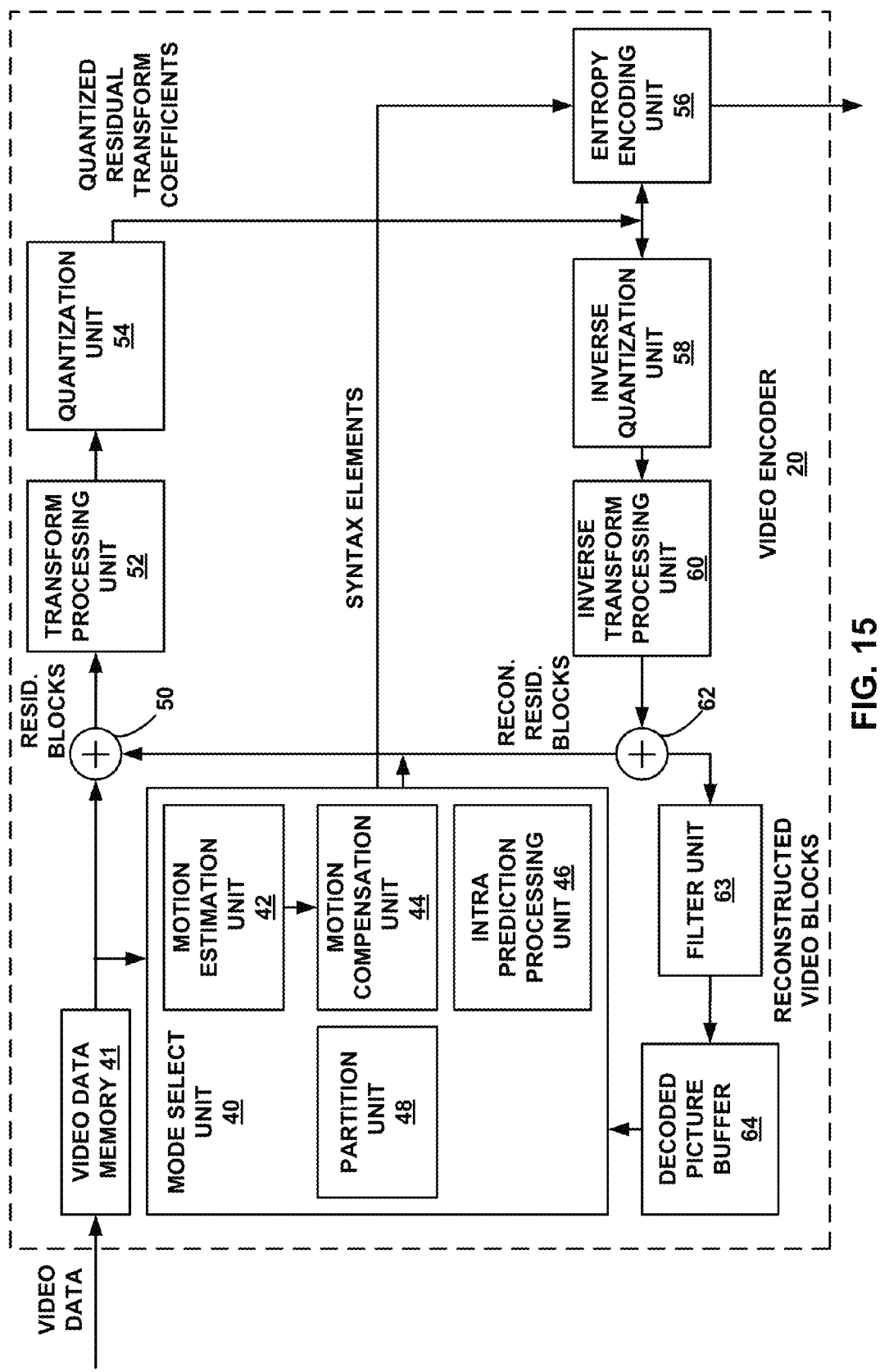
FIG. 15 is a block diagram illustrating an example of a video encoder that may implement the techniques of this disclosure.

FIG. 15 is a block diagram illustrating an example of video encoder 20 that may be configured to implement the techniques of this disclosure. Video encoder 20 may perform intra- and inter-coding (including inter-view coding) of video blocks within video slices, e.g., slices of both texture images and depth maps. Texture information generally includes luminance (brightness or intensity) and chrominance (color, e.g., red hues and blue hues) information. In some examples, video encoder 20 may determine coding modes relative to luminance slices, and reuse prediction information from coding the luminance information to encode chrominance information (e.g., by reusing partitioning information, intra-prediction mode selections, motion vectors, or the like). Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 15, video encoder 20 receives a current video block (that is, a block of video data, such as a luminance block, a chrominance block, or a depth block) within a video frame (e.g., a texture image or a depth map) to be encoded. In the example of FIG. 15, video encoder 20 includes mode select unit 40, video data memory 41, decoded picture buffer 64, summer 50, transform processing unit 52, quantization unit 54, filter unit 63, and entropy encoding unit 56. Filter unit 63 may apply a deblocking filter process as described in this disclosure. Mode select unit 40, in turn, includes motion compensation unit 44, motion estimation unit 42, intra-prediction processing unit 46, and partition unit 48. For video block reconstruction, video encoder 20 also includes inverse quantization unit 58, inverse transform processing unit 60, and summer 62. Filter unit 63 may include a deblocking filter and/or an SAO filter to filter block boundaries to remove blockiness artifacts from reconstructed video. Additional filters (in loop or post loop) may also be used in addition to the deblocking filter. Such filters are not shown for brevity, but if desired, may filter the output of summer 50 (as an in-loop filter).

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. The reference picture lists may be constructed using the techniques of this disclosure. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. In this manner, motion compensation unit 44 may reuse motion information determined for luma components to code chroma components such that motion estimation unit 42 need not perform a motion search for the chroma components. Mode select unit 40 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes.

For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

After selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients.

The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the reference pictures stored in decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

Video encoder 20 may encode depth maps in a manner that substantially resembles coding techniques for coding luminance components, albeit without corresponding chrominance components. For example, intra-prediction processing unit 46 may intra-predict blocks of depth maps, while motion estimation unit 42 and motion compensation unit 44 may inter-predict blocks of depth maps. However, as discussed above, during inter-prediction of depth maps, motion compensation unit 44 may scale (that is, adjust) values of reference depth maps based on differences in depth ranges and precision values for the depth ranges. For example, if different maximum depth values in the current depth map and a reference depth map correspond to the same real-world depth, video encoder 20 may scale the maximum depth value of the reference depth map to be equal to the maximum depth value in the current depth map, for purposes of prediction. Additionally or alternatively, video encoder 20 may use the updated depth range values and precision values to generate a view synthesis picture for view synthesis prediction, e.g., using techniques substantially similar to inter-view prediction.

Video encoder 20 represents an example of a video encoder that may be configured to perform any of the techniques described in this disclosure, alone or in any combination. For example, video encoder 20 may be configured to perform techniques for sub-PU level motion prediction for video coding in 3D-HEVC.

In one example, video encoder 20 may be configured to perform a sub-PU BVSP mode to predict a PU that includes two or more sub-PUs. In the sub-PU BVSP mode, motion compensation unit 44 of video encoder 20 determines first motion information for a current PU that includes at least one disparity motion vector and an associated reference view index that identifies an inter-view reference picture. Motion compensation unit 44 then partitions the current PU into two or more sub-PUs, and determines second motion information for each of the sub-PUs that includes at least one disparity motion vector associated with a depth block of the inter-view reference picture corresponding to each of the sub-PUs. Motion compensation unit 44 performs motion compensation to predict each of the sub-PUs of the PU based on the second motion information for each of the sub-PUs. According to the techniques of this disclosure, for each PU predicted using the sub-PU BVSP mode, video encoder 20 stores the second motion information derived for each of the sub-PUs of the current PU even after motion compensation is performed. The second motion information may be stored in decoded picture buffer 64. The additional motion information stored for the current PU may then be used to predict subsequent PUs for which the current PU is a neighboring block.

In another example, video encoder 20 may be configured to perform an advanced TMVP mode to predict sub-PUs of a PU in single layer coding for which motion vector refinement may be allowed. In the advanced TMVP mode, motion compensation unit 44 of video encoder 20 determines a first stage motion vector for a current PU that identifies a block of a reference picture corresponding to the current PU. Motion compensation unit 44 then partitions the current PU into two or more sub-PUs, and determines second stage motion information for each of the sub-PUs from the block of the reference picture identified by the first stage motion vector, where the second stage motion information for each of the sub-PUs includes at least one motion vector and an associated reference index. Motion compensation unit 44 performs motion compensation to predict each of the sub-PUs separately based on the second stage motion information for each of the sub-PUs. In some examples, motion compensation unit 44 may determine a motion vector difference to refine the at least one motion vector of the second stage motion information for each of the sub-PUs.

In another example, video encoder 20 may be configured to perform techniques related to deblocking filter processes applied to CUs of a video block that include at least one PU with multiple sub-PUs. According to the techniques of this disclosure, prior to applying a deblocking filter to a CU of the video block that includes the PU with the sub-PUs, filter unit 63 of video encoder 20 converts the CU in order to create artificial PU boundaries or artificial TU boundaries at the sub-PU boundaries. In one example, filter unit 63 converts a transform tree of the CU in order to associate the PU with a transform tree hierarchy and associate each of the sub-PUs with a TU such that the sub-PU boundaries are converted to artificial TU boundaries. In another example, filter unit 63 converts the CU to a coding tree in order to associate the PU with a CU and associate each of the sub-PUs with a PU such that the sub-PU boundaries are converted to artificial PU boundaries. Filter unit 63 then applies the deblocking filter to the PU boundaries between two adjacent PUs of the CU and/or the TU boundaries between two adjacent TUs of the CU, including the artificial PU boundaries and the artificial TU boundaries.

Figure 16:
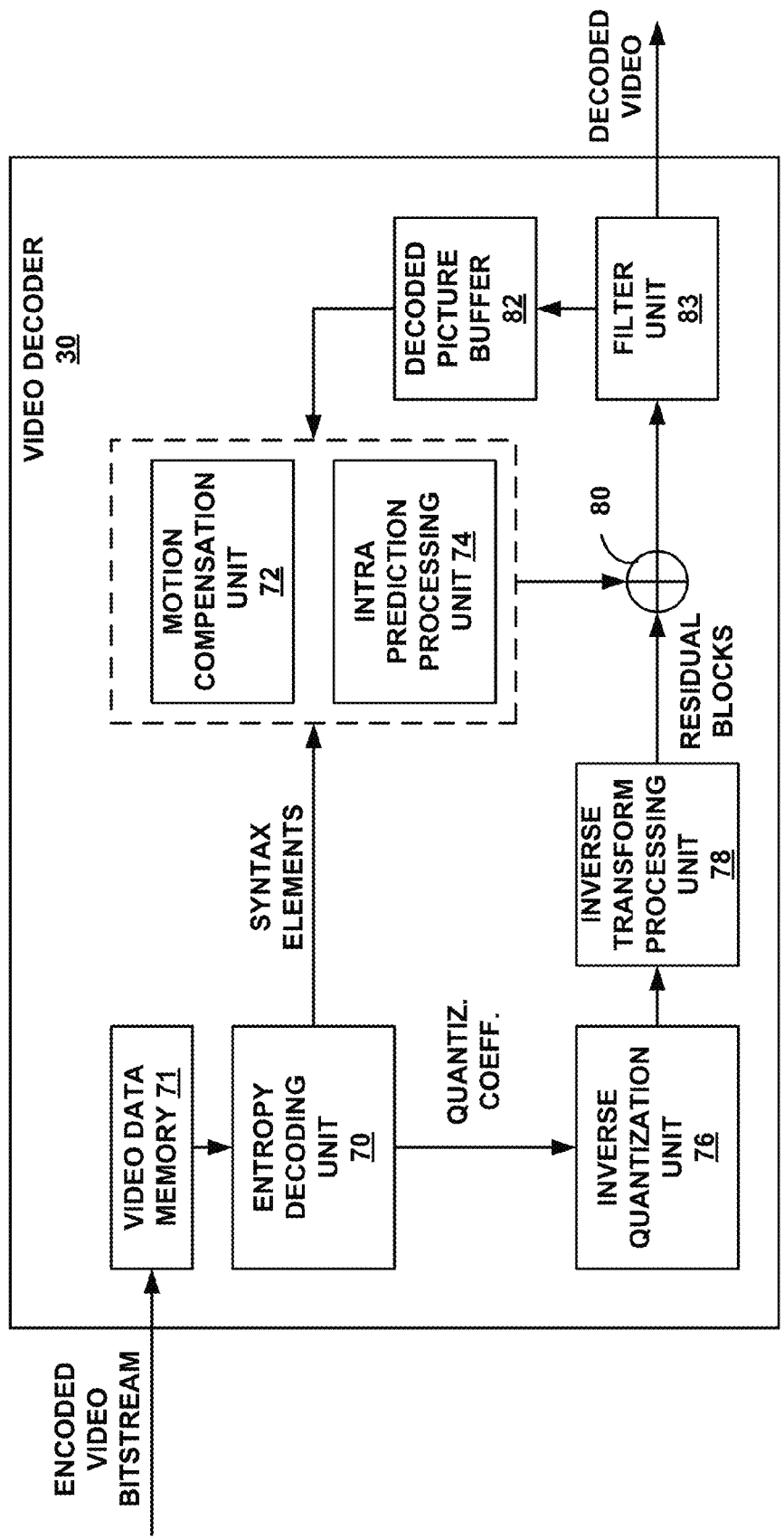
FIG. 16 is a block diagram illustrating an example of a video decoder that may implement the techniques of this disclosure.

FIG. 16 is a block diagram illustrating an example of video decoder 30 that may implement the techniques of this disclosure. In the example of FIG. 16, video decoder 30 includes an entropy decoding unit 70, video data memory 71, motion compensation unit 72, intra prediction processing unit 74, inverse quantization unit 76, inverse transform processing unit 78, decoded picture buffer 82, filter unit 83, and summer 80. Video decoder 30 may, in some examples, perform a decoding pass generally reciprocal to the encoding pass described with respect to video encoder 20 (FIG. 15). Motion compensation unit 72 may generate prediction data based on motion vectors received from entropy decoding unit 70, while intra-prediction processing unit 74 may generate prediction data based on intra-prediction mode indicators received from entropy decoding unit 70.

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71 and decoded picture buffer 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using the techniques of this disclosure based on reference pictures stored in decoded picture buffer 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes. i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 90 represents the component or components that perform this summation operation. Filter unit 63 may apply a deblocking filter process. Filter unit 63 may include a deblocking filter and/or an SAO filter to filter block boundaries to remove blockiness artifacts from reconstructed video. Additional filters (in loop or post loop) may also be used in addition to the deblocking filter. Such filters are not shown for brevity, but if desired, may filter the output of summer 80 (as an in-loop filter). The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1.

Video decoder 30 may decode depth maps in a manner that substantially resembles decoding techniques for decoding luminance components, albeit without corresponding chrominance components. For example, intra-prediction processing unit 74 may intra-predict blocks of depth maps, while motion compensation unit 72 may inter-predict blocks of depth maps. However, as discussed above, during inter-prediction of depth maps, motion compensation unit 72 may scale (that is, adjust) values of reference depth maps based on differences in depth ranges and precision values for the depth ranges. For example, if different maximum depth values in the current depth map and a reference depth map correspond to the same real-world depth, video decoder 30 may scale the maximum depth value of the reference depth map to be equal to the maximum depth value in the current depth map, for purposes of prediction. Additionally or alternatively, video decoder 30 may use the updated depth range values and precision values to generate a view synthesis picture for view synthesis prediction. e.g., using techniques substantially similar to inter-view prediction.

Video decoder 30 represents an example of a video decoder that may be configured to perform any of the techniques described in this disclosure, alone or in any combination. For example, video decoder 30 may be configured to perform techniques for sub-PU level motion prediction for video coding in 3D-HEVC.

In one example, video decoder 30 may be configured to perform a sub-PU BVSP mode to predict a PU that includes two or more sub-PUs. In the sub-PU BVSP mode, motion compensation unit 72 of video decoder 30 determines first motion information for a current PU that includes at least one disparity motion vector and an associated reference view index that identifies an inter-view reference picture. Motion compensation unit 72 then partitions the current PU into two or more sub-PUs, and determines second motion information for each of the sub-PUs that includes at least one disparity motion vector associated with a depth block of the inter-view reference picture corresponding to each of the sub-PUs. Motion compensation unit 72 performs motion compensation to predict each of the sub-PUs of the PU based on the second motion information for each of the sub-PUs. According to the techniques of this disclosure, for each PU predicted using the sub-PU BVSP mode, video decoder 30 stores the second motion information derived for each of the sub-PUs of the current PU even after motion compensation is performed. The second motion information may be stored in decoded picture buffer 82. The additional motion information stored for the current PU may then be used to predict subsequent PUs for which the current PU is a neighboring block.

In another example, video decoder 30 may be configured to perform an advanced TMVP mode to predict sub-PUs of a PU in single layer coding for which motion vector refinement may be allowed. In the advanced TMVP mode, motion compensation unit 72 of video decoder 30 determines a first stage motion vector for a current PU that identifies a block of a reference picture corresponding to the current PU. Motion compensation unit 72 then partitions the current PU into two or more sub-PUs, and determines second stage motion information for each of the sub-PUs from the block of the reference picture identified by the first stage motion vector, where the second stage motion information for each of the sub-PUs includes at least one motion vector and an associated reference index. Motion compensation unit 72 performs motion compensation to predict each of the sub-PUs separately based on the second stage motion information for each of the sub-PUs. In some examples, motion compensation unit 72 may determine a motion vector difference to refine the at least one motion vector of the second stage motion information for each of the sub-PUs.

In another example, video decoder 30 may be configured to perform techniques related to deblocking filter processes applied to CUs of a video block that include at least one PU with multiple sub-PUs. According to the techniques of this disclosure, prior to applying a deblocking filter to a CU of the video block that includes the PU with the sub-PUs, filter unit 83 of video decoder 30 converts the CU in order to create artificial PU boundaries or artificial TU boundaries at the sub-PU boundaries. In one example, filter unit 83 converts a transform tree of the CU in order to associate the PU with a transform tree hierarchy and associate each of the sub-PUs with a TU such that the sub-PU boundaries are converted to artificial TU boundaries. In another example, filter unit 83 converts the CU to a coding tree in order to associate the PU with a CU and associate each of the sub-PUs with a PU such that the sub-PU boundaries are converted to artificial PU boundaries. Filter unit 83 then applies the deblocking filter to the PU boundaries between two adjacent PUs of the CU and/or the TU boundaries between two adjacent TUs of the CU, including the artificial PU boundaries and the artificial TU boundaries.

Figure 17:
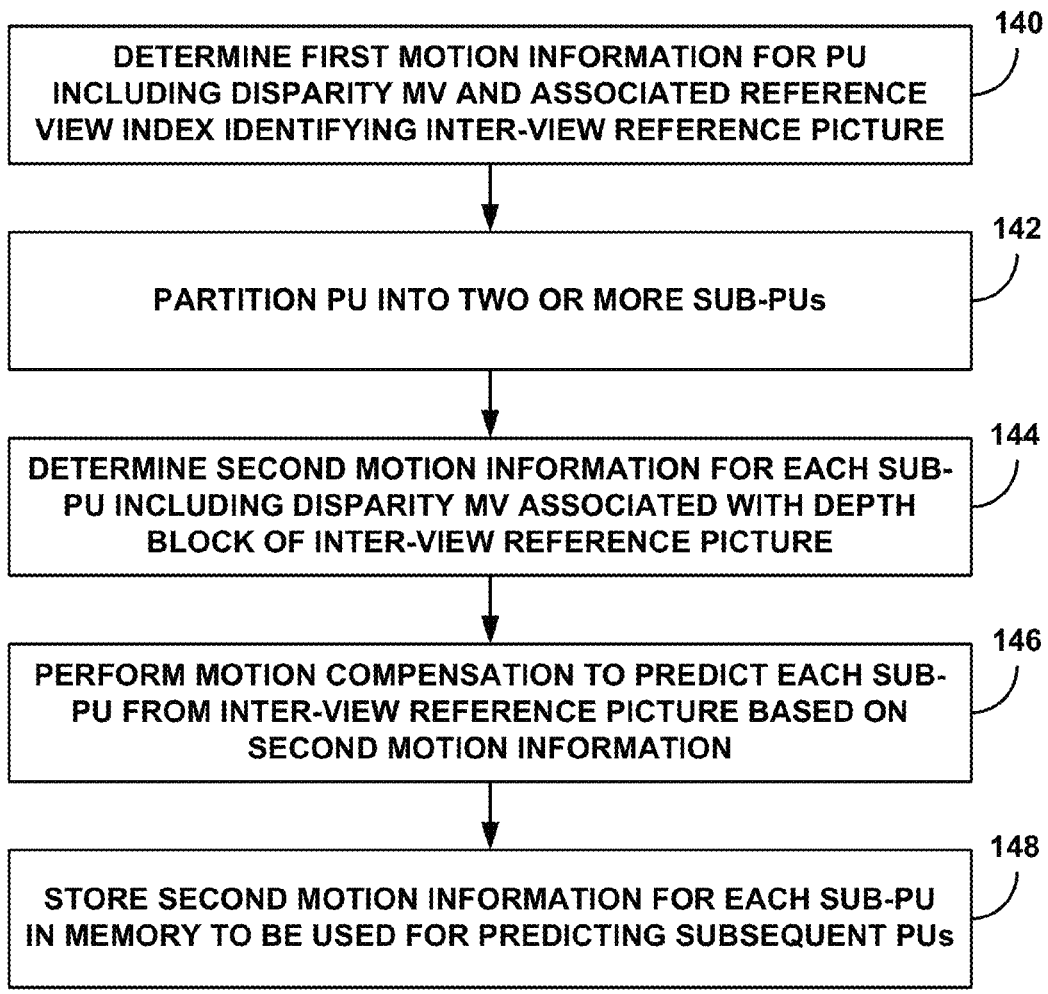
FIG. 17 is a flowchart illustrating an example operation of predicting a current PU using a sub-PU BVSP mode and storing the determined sub-PU motion information storage.

FIG. 17 is a flowchart illustrating an example operation of predicting a current PU using a sub-PU BVSP mode and storing the determined sub-PU motion information storage. The illustrated operation is described in this disclosure with respect to video decoder 30 of FIG. 16. In other examples, the illustrated operation may be performed by video encoder 20 of FIG. 15, or any other encoding or decoding device that operates according to the 3D-HEVC standard.

Video decoder 30 receives an encoded video bitstream that represents video blocks of an encoded video slice and associated syntax elements. Entropy decoding unit 70 of video decoder 30 decodes the bitstream to generate quantized transform coefficients, motion information and prediction mode indicators, and other syntax elements. Entropy decoding unit 70 sends the decoded quantized transform coefficient to inverse quantization unit 76 and inverse transform processing unit 78 to reconstruct residual blocks of the video blocks to be decoded. Entropy decoding unit 70 sends the decoded motion information and inter prediction mode indicators to motion compensation unit 72.

Motion compensation unit 72 predicts each PU of each CU of the video blocks to be decoded according to the indicated one of the merge or AMVP inter prediction modes. For example, in the merge mode, motion compensation unit 72 may generate a merge mode candidate list of motion information that includes motion information, i.e., motion vectors and associated reference indices, of spatial and temporal neighboring blocks of the current PU. In this case, the decoded motion information may include a merge index that indicates one of the sets of motion information in the merge mode candidate list for predicting the current PU. In the BVSP mode, the merge mode candidate list includes a special BVSP candidate having motion information that includes a disparity motion vector and an associated reference view index, and depth information is used to refine the motion information.

According to the techniques of this disclosure, motion compensation unit 72 determines first motion information for a current PU from neighboring blocks of the PU according to the BVSP mode in which the first motion information includes at least one disparity motion vector and an associated reference view index that identifies an inter-view reference picture (140). As described above, motion compensation unit 72 may select the first motion information for the current PU as the BVSP candidate from the merge mode candidate list. In some cases, the first motion information for the current PU may include a disparity motion vector corresponding to each of the first and second reference picture lists.

Motion compensation unit 72 then partitions the current PU into two or more sub-PUs (142). Motion compensation unit 72 determines second motion information for each of the sub-PUs in which the second motion information includes at least one disparity motion vector associated a depth block of the inter-view reference picture corresponding to each of the sub-PUs (144). For example, motion compensation unit 72 may select a maximum value of the four corner pixels for the depth block of the inter-view reference picture corresponding to each of the sub-PUs, and convert the maximum value to a horizontal component of the disparity motion vector for each of the sub-PUs. The vertical component of the disparity motion vector for each of the sub-PUs is equal to zero. In some cases, the second motion information for each of the sub-PUs may include a disparity motion vector corresponding to each of the first and second reference picture lists.

Motion compensation unit 72 performs motion compensation to predict each of the sub-PUs of the current PU from the inter-view reference picture based on the second motion information (146). After performing motion compensation, video decoder 30 stores the second motion information for each of the sub-PUs of the current PU in a memory, e.g., decoded picture buffer 82 of video decoder 30, to be used for predicting subsequent PUs (148). For example, video decoder 30 may store the disparity motion vector derived for each of the sub-PUs in decoded picture buffer 82 associated with a reference picture list that includes the inter-view reference picture identified by the reference view index of the first motion information for the PU. After generating a predictive block for each of the sub-PUs of the PU during motion compensation, video decoder 30 generates a reconstructed version of the video block based on a reconstructed version of a corresponding residual block and the predictive block for each of the sub-PUs.

Conventionally, in the BVSP mode of 3D-HEVC, after performing motion compensation to predict each of the sub-PUs, only a single disparity motion vector corresponding to each reference picture list is stored for the current PU. The single disparity motion vector is stored for each reference picture list even though the motion compensation of the PU is based on multiple motion vectors for the multiple sub-PUs of the PU. In this case, when the current PU is used to predict a subsequent PU, the sub-PUs of the current PU are viewed as having the same motion vectors such that the sub-PU BVSP mode has little impact on improving accuracy of motion vector prediction.

According to the techniques of this disclosure, for each PU coded in the sub-PU BVSP mode, video decoder 30 stores the second motion information derived for each of the sub-PUs of the current PU, even after motion compensation is performed. The additional motion information stored for the current PU may then be used to predict subsequent PUs for which the current PU is a neighboring block. For example, motion compensation unit 72 may generate a merge mode candidate list of motion information for predicting a subsequent PU that includes the second motion information for at least one of the sub-PUs of the PU stored in decoded picture buffer 82 as a sub-PU BVSP candidate in the merge mode candidate list. In one example, if the subsequent PU is coded in the sub-PU BVSP mode, motion compensation unit 72 may not need to derive the second motion information for each of the sub-PUs of the subsequent PU. Instead, motion compensation unit 72 may instead select the second motion information as the sub-PU BVSP candidate from the merge mode candidate list of motion information for predicting the sub-PUs of the subsequent PU.

Figure 18:
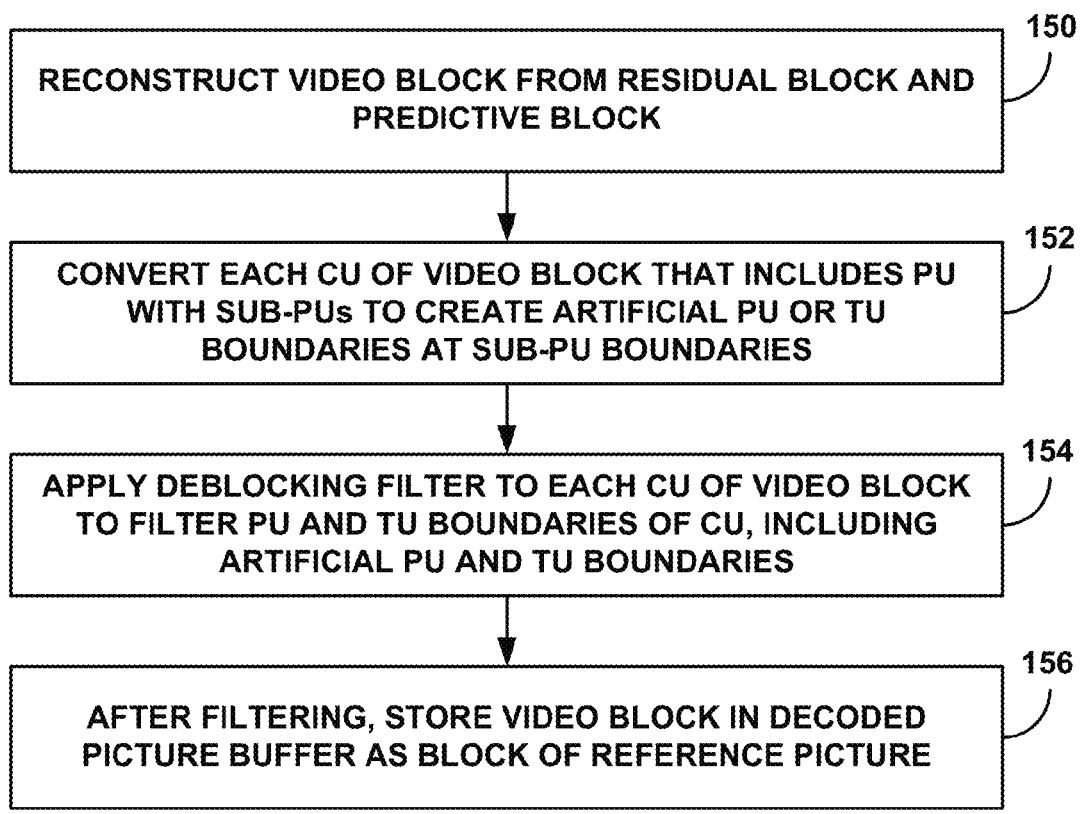
FIG. 18 is a flowchart illustrating an example operation of applying a deblocking filter to each CU of a video block to filter TU boundaries and PU boundaries including sub-PU boundaries within the CU.

FIG. 18 is a flowchart illustrating an example operation of applying a deblocking filter to each CU of a video block to filter TU boundaries and PU boundaries including sub-PU boundaries within the CU. The deblocking filter is applied after reconstructing the video block and before storing the video block in a decoded picture buffer as a block of a reference picture. The illustrated operation is described in this disclosure with respect to video decoder 30 of FIG. 16. In other examples, the illustrated operation may be performed in the video block reconstruction loop of video encoder 20 of FIG. 15, or any other encoding or decoding device that uses a sub-PU design and deblocking filters.

Video decoder 30 generates a reconstructed version of a video block based on a reconstructed version of a corresponding residual block and a predictive block (150). The video block includes at least one CU, and the CU may include at least one PU that is partitioned into two or more sub-PUs. As described above with respect to FIG. 17, motion compensation unit 72 of video decoder 30 may generate a predictive block during video compression for each of the sub-PUs of the PU. Deblocking filters for the HEVC standard are not designed to filter within a PU. i.e., along sub-PU boundaries, because for HEVC blocks it is assumed that motion compensation is the same for the entire PU. This disclosure describes techniques for converting a PU with sub-PUs to a deblocking friendly structure so that HEVC deblocking filters may continue to be used for 3D-HEVC blocks.

Prior to applying a deblocking filter to the CU of the video block that includes the PU with the two or more sub-PUs, filter unit 83 of video decoder 30 converts the CU to create artificial PU boundaries or artificial TU boundaries at sub-PU boundaries between two adjacent sub-PUs of the PU (152). In one example, filter unit 83 converts a transform tree of the CU in order to associate the PU with a transform tree hierarchy and associate each of the sub-PUs with a TU such that the sub-PU boundaries are converted to artificial TU boundaries. In another example, filter unit 83 converts the CU to a coding tree in order to associate the PU with a CU and associate each of the sub-PUs with a PU such that the sub-PU boundaries are converted to artificial PU boundaries.

Filter unit 83 then applies the deblocking filter to the PU boundaries between two adjacent PUs of the CU and/or the TU boundaries between two adjacent TUs of the CU, including the artificial PU boundaries and the artificial TU boundaries (154). After filtering each of the CUs of the reconstructed version of the video block, filter unit 83 stores the video block in decoded picture buffer 82 as a block of a reference picture (156).

Figure 19:
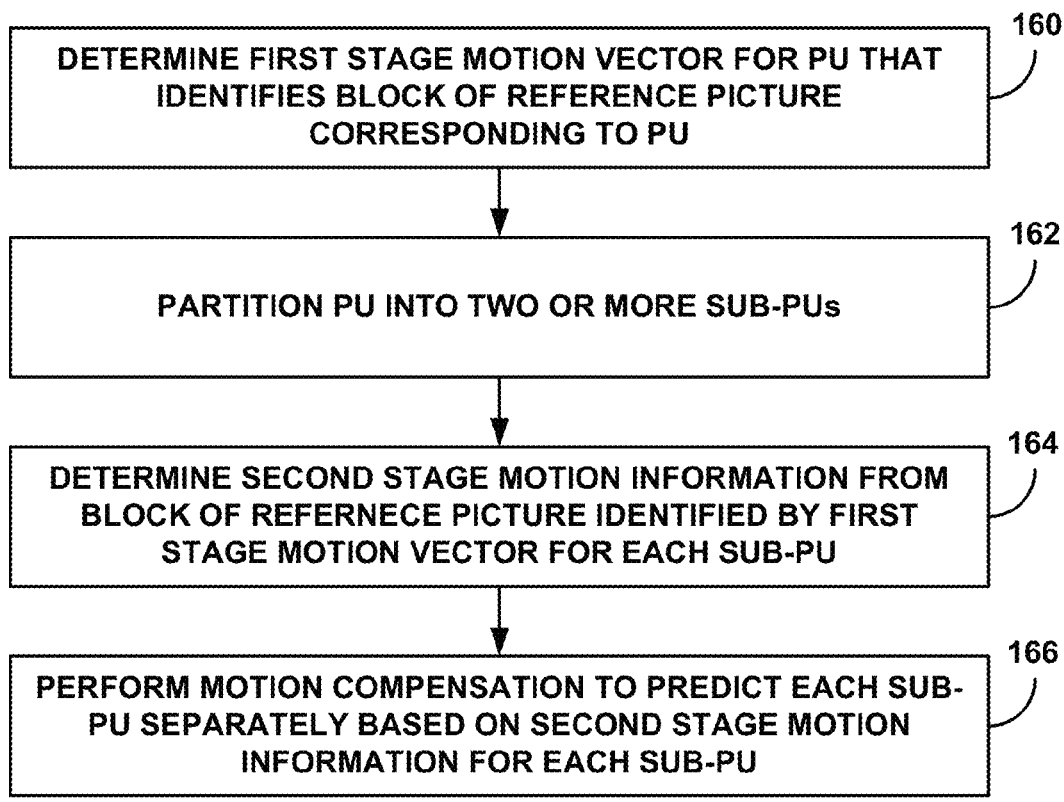
FIG. 19 flowchart illustrating an example operation of an advanced TMVP mode to predict sub-PUs of a PU in single layer coding.

FIG. 19 flowchart illustrating an example operation of an advanced TMVP mode to predict sub-PUs of a PU in single layer coding. The illustrated operation is described in this disclosure with respect to video decoder 30 of FIG. 16. In other examples, the illustrated operation may be performed by video encoder 20 of FIG. 15, or any other encoding or decoding device that uses a sub-PU design.

Video decoder 30 receives an encoded video bitstream that represents video blocks of an encoded video slice and associated syntax elements. Entropy decoding unit 70 of video decoder 30 decodes the bitstream to generate quantized transform coefficients, motion information and prediction mode indicators, and other syntax elements. Entropy decoding unit 70 sends the decoded quantized transform coefficient to inverse quantization unit 76 and inverse transform processing unit 78 to reconstruct residual blocks of the video blocks to be decoded. Entropy decoding unit 70 sends the decoded motion information and inter prediction mode indicators to motion compensation unit 72.

Motion compensation unit 72 predicts each PU of each CU of the video blocks to be decoded according to the indicated one of the merge or AMVP inter prediction modes. For example, in the merge mode, motion compensation unit 72 may generate a merge mode candidate list of motion information that includes motion information, i.e., motion vectors and associated reference indices, of spatial and temporal neighboring blocks of the current PU. In this case, the decoded motion information may include a merge index that indicates one of the sets of motion information in the merge mode candidate list for predicting the current PU. In another example, in the AMVP mode, motion compensation unit 72 may generate an AMVP mode candidate list that only includes motion vectors of the spatial and temporal neighboring blocks of the current PU. In this case, the decoded motion information may include an AMVP index that indicates one of the motion vectors in the AMVP mode candidate list, and also include an explicitly signaled reference index and any motion vector difference to refine the selected motion vector for predicting the current PU.

Conventionally, the sub-PU design is only enabled for inter-layer or inter-view prediction using the merge inter prediction mode. This disclosure describes an advanced TMVP mode to predict sub-PUs of a PU in single layer coding for which motion vector refinement may be allowed. In one example, to indicate performance of the advanced TMVP mode to predict the current PU, motion compensation unit 72 may generate an advanced TMVP candidate in the merge mode candidate list for the PU, where selection of the advanced TMVP candidate indicates performance of the advanced TMVP mode to predict the PU.

According to the techniques of this disclosure, motion compensation unit 72 determines a first stage motion vector for a current PU from neighboring blocks of the PU that identifies a block of a reference picture corresponding to current PU (160). As one example, motion compensation unit 72 may derive the first stage motion vector from the spatial neighboring blocks and/or the temporal neighboring blocks of the current PU. As another example, motion compensation unit 72 may select the first stage motion vector from a merge mode candidate list for the current PU. In other examples, the first stage motion vector may be set to be a constant or pre-defined value.

Motion compensation unit 72 then partitions the current PU into two or more sub-PUs (162). Motion compensation unit 72 determines second stage motion information for each of the sub-PUs from the block of the reference picture identified by the first stage motion vector, where the second stage motion information for each of the sub-PUs includes at least one motion vector and an associated reference index (164). In some cases, the second stage motion information for each of the sub-PUs may include a motion vector corresponding to each of the first and second reference picture lists. In the case where at least one of the motion vectors of the second stage motion information for one of the sub-PUs is unavailable, motion compensation unit 72 may use a representative motion vector, such as the first stage motion vector, for the one of the sub-PUs.

In some examples, instead of operating purely in the merge mode, motion vector refinement similar to the AMVP mode may be enabled. For example, motion compensation unit 72 may determine motion refinement data for the current PU predicted using the advanced TMVP mode. In one case, motion compensation unit 72 may determine a motion vector difference applicable to the second stage motion information for one or more of the sub-PUs. As described above, the motion vector difference may be signaled in the motion information included in the encoded video bitstream. In this example, to indicate performance of the advanced TMVP mode using the motion refinement data to predict the current PU, motion compensation unit 72 may generate an advanced TMVP candidate in the AMVP mode candidate list for the PU, where selection of the advanced TMVP candidate indicates performance of the advanced TMVP mode using the motion refinement data to predict the PU.

Motion compensation unit 72 performs motion compensation to predict each of the sub-PUs separately based on the second stage motion information for each of the sub-PUs (166). After generating a predictive block for each of the sub-PUs of the PU during motion compensation, video decoder 30 generates a reconstructed version of the video block based on a reconstructed version of a corresponding residual block and the predictive block for each of the sub-PUs.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data comprising:
    determining a first stage motion vector for a prediction unit (PU) of a coding unit (CU) of a video block from neighboring blocks of the PU as a first stage of an advanced temporal motion vector prediction (TMVP) mode, wherein the first stage motion vector identifies a block of a reference picture corresponding to the PU;
    partitioning the PU into two or more sub-PUs;
    determining second stage motion information for each of the sub-PUs from the block of the reference picture identified by the first stage motion vector as a second stage of the advanced TMVP mode, wherein the second stage motion information for each of the sub-PUs includes at least one motion vector and an associated reference index; and
    performing motion compensation for each of the sub-PUs separately based on the second stage motion information for each of the sub-PUs.

2. The method of claim 1, wherein determining the first stage motion vector for the PU comprises deriving the first stage motion vector from one or more of spatial neighboring blocks or temporal neighboring blocks of the PU.

3. The method of claim 1, wherein determining the first stage motion vector for the PU comprises selecting the first stage motion vector from a merge mode candidate list for the PU.

4. The method of claim 1, further comprising generating an advanced TMVP candidate in a merge mode candidate list for the PU, wherein the advanced TMVP candidate indicates performance of the advanced TMVP mode to predict the PU.

5. The method of claim 1, further comprising, based on the at least one motion vector of the second stage motion information for one of the sub-PUs being unavailable, using a representative motion vector for the one of the sub-PUs.

6. The method of claim 1, further comprising determining motion refinement data for the PU predicted using the advanced TMVP mode.

7. The method of claim 6, wherein determining the motion refinement data comprises determining a single motion vector difference for the PU that is applicable to the second stage motion information for each of the sub-PUs of the PU.

8. The method of claim 6, wherein determining the motion refinement data comprises determining a different motion vector difference for the second stage motion information for each of the sub-PUs.

9. The method of claim 6, further comprising generating an advanced TMVP candidate in an advanced motion vector prediction (AMVP) mode candidate list for the PU, wherein the advanced TMVP candidate indicates performance of the advanced TMVP mode using the motion refinement data to predict the current PU.

10. The method of claim 1, further comprising:
    generating a predictive block for each of the sub-PUs of the PU based on the second motion information;
    generating a residual block based on the video block and the predictive block for each of the sub-PUs; and
    encoding the residual block and an indicator of at least the first motion stage motion vector for the PU in a video bitstream.

11. The method of claim 1, further comprising:
    decoding a residual block and an indicator of at least the first stage motion vector for the PU from a received video bitstream;
    generating a predictive block for each of the sub-PUs of the PU based on the second motion information; and
    generating a reconstructed version of the video block based on the residual block and the predictive block for each of the sub-PUs.

12. A video processing device comprising:
    a memory configured to store video data; and one or more processors in communication with the memory and configured to:
- determine a first stage motion vector for a prediction unit (PU) of a coding unit (CU) of a video block from neighboring blocks of the PU as a first stage of an advanced temporal motion vector prediction (TMVP) mode, wherein the first stage motion vector identifies a block of a reference picture corresponding to the PU,
- partition the PU into two or more sub-PUs,
- determine second stage motion information for each of the sub-PUs from the block of the reference picture identified by the first stage motion vector as a second stage of the advanced TMVP mode, wherein the second stage motion information for each of the sub-PUs includes at least one motion vector and an associated reference index, and
- perform motion compensation for each of the sub-PUs separately based on the second stage motion information for each of the sub-PUs.

13. The device of claim 12, wherein the one or more processors are configured to derive the first stage motion vector from one or more of spatial neighboring blocks or temporal neighboring blocks of the PU.

14. The device of claim 12, wherein the one or more processors at configured to select the first stage motion vector from a merge mode candidate list for the PU.

15. The device of claim 12, wherein the one or more processors are configured to generate an advanced TMVP candidate in a merge mode candidate list for the PU, wherein the advanced TMVP candidate indicates performance of the advanced TMVP mode to predict the PU.

16. The device of claim 12, wherein, based on the at least one motion vector of the second stage motion information for one of the sub-PUs being unavailable, the one or more processors are configured to use a representative motion vector for the one of the sub-PUs.

17. The device of claim 12, wherein the one or more processors are configured to determine motion refinement data for the PU predicted using the advanced TMVP mode.

18. The device of claim 17, wherein the one or more processors are configured to determine a single motion vector difference for the PU that is applicable to the second stage motion information for each of the sub-PUs of the PU.

19. The device of claim 17, wherein the one or more processors are configured to determine a different motion vector difference for the second stage motion information for each of the sub-PUs.

20. The device of claim 17, wherein the one or more processors are configured to generate an advanced TMVP candidate in an advanced motion vector prediction (AMVP) mode candidate list for the PU, wherein the advanced TMVP candidate indicates performance of the advanced TMVP mode using the motion refinement data to predict the current PU.

21. The device of claim 12, wherein the video processing device comprises a video encoding device, and wherein the one or more processors are configured to:
- generate a predictive block for each of the sub-PUs of the PU based on the second motion information;
- generate a residual block based on the video block and the predictive block for each of the sub-PUs; and
- encode the residual block and an indicator of at least the first motion stage motion vector for the PU in a video bitstream.

22. The device of claim 12, wherein the video processing device comprises a video decoding device, and wherein the one or more processors are configured to:
- decode a residual block and an indicator of at least the first stage motion vector for the PU from a received video bitstream;
- generate a predictive block for each of the sub-PUs of the PU based on the second motion information; and
- generate a reconstructed version of the video block based on the residual block and the predictive block for each of the sub-PUs.

23. A video processing device comprising:
- means for determining a first stage motion vector for a prediction unit (PU) of a coding unit (CU) of a video block from neighboring blocks of the PU as a first stage of an advanced temporal motion vector prediction (TMVP) mode, wherein the first stage motion vector identifies a block of a reference picture corresponding to the PU;
- means for partitioning the PU into two or more sub-PUs;
- means for determining second stage motion information for each of the sub-PUs from the block of the reference picture identified by the first stage motion vector as a second stage of the advanced TMVP mode, wherein the second stage motion information for each of the sub-PUs includes at least one motion vector and an associated reference index; and
- means for performing motion compensation for each of the sub-PUs separately based on the second stage motion information for each of the sub-PUs.

24. A computer-readable storage medium storing instructions for processing video data that, when executed, cause one or more processors to:
- determine a first stage motion vector for a prediction unit (PU) of a coding unit (CU) of a video block from neighboring blocks of the PU as a first stage of an advanced temporal motion vector prediction (TMVP) mode, wherein the first stage motion vector identifies a block of a reference picture corresponding to the PU;
- partition the PU into two or more sub-PUs;
- determine second stage motion information for each of the sub-PUs from the block of the reference picture identified by the first stage motion vector as a second stage of the advanced TMVP mode, wherein the second stage motion information for each of the sub-PUs includes at least one motion vector and an associated reference index; and
- perform motion compensation for each of the sub-PUs separately based on the second stage motion information for each of the sub-PUs.

* * * * *